(12) United States Patent
Gil et al.

(10) Patent No.: US 12,065,315 B2
(45) Date of Patent: Aug. 20, 2024

(54) SYSTEMS, METHODS, AND APPARATUSES FOR LOCATING, ENGAGING, AND SHIFTING OBJECTS IN AUTOMATED OR SEMI-AUTOMATED FASHION

(71) Applicant: United Parcel Service of America, Inc., Atlanta, GA (US)

(72) Inventors: Julio Gil, Veldhoven (NL); Julian Leland Bell, Decatur, GA (US); Youngjun Choi, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 18/138,448

(22) Filed: Apr. 24, 2023

(65) Prior Publication Data

US 2023/0257209 A1 Aug. 17, 2023

Related U.S. Application Data

(63) Continuation of application No. 17/553,599, filed on Dec. 16, 2021, now Pat. No. 11,667,476.

(51) Int. Cl.
*B65G 47/24* (2006.01)
*B65G 15/10* (2006.01)
*B65G 65/02* (2006.01)
*B65G 67/46* (2006.01)
*B65G 67/08* (2006.01)

(52) U.S. Cl.
CPC ............ *B65G 47/24* (2013.01); *B65G 15/105* (2013.01); *B65G 65/02* (2013.01); *B65G 67/46* (2013.01); *B65G 67/08* (2013.01)

(58) Field of Classification Search
CPC ...... B65G 15/10; B65G 15/105; B65G 47/24; B65G 65/02; B65G 67/46
USPC .................................. 198/512, 604; 414/528
See application file for complete search history.

(56) References Cited

U.S. PATENT DOCUMENTS

| 5,265,712 A | 11/1993 | Krieg |
| 5,524,747 A | 6/1996 | Wohlfahrt et al. |
| 6,422,802 B1 | 7/2002 | Herrin |

(Continued)

FOREIGN PATENT DOCUMENTS

WO 2008/040037 A1 4/2008

OTHER PUBLICATIONS

US 2022/0332524 A1, Matsuoka et al., Oct. 20, 2022.*

*Primary Examiner* — Douglas A Hess
(74) *Attorney, Agent, or Firm* — Shook, Hardy & Bacon L.L.P.

(57) ABSTRACT

Disclosed herein are systems, methods, and apparatuses for locating, engaging, and shifting objects. The systems may be used to unload objects from a storage space, e.g., inside a vehicle or facility, including one associated with a logistics network operation. The systems disclosed herein may operate in automated or semi-automated fashion, e.g., at the direction of a control system associated with a computing device. The systems may further utilize shifter mechanisms that each include one or more belt-driven mechanisms and position-changing mechanisms that facilitate the locating, engaging, and shifting of objects in a storage space. The components of these systems may operate independently, or in coordination, thereby increasing the efficiency of an object-handling operation.

20 Claims, 11 Drawing Sheets

(56) References Cited

U.S. PATENT DOCUMENTS

| | | | |
|---|---|---|---|
| 6,652,014 B2 * | 11/2003 | Schmalz | B25J 15/0616 |
| | | | 414/737 |
| 8,365,898 B2 | 2/2013 | Horst | |
| 9,498,887 B1 | 11/2016 | Zevenbergen et al. | |
| 9,587,348 B2 | 3/2017 | Yano | |
| 9,969,573 B2 * | 5/2018 | Girtman | B25J 11/00 |
| 10,040,586 B2 | 8/2018 | Laskis et al. | |
| 10,351,362 B2 | 7/2019 | Tanaka et al. | |
| 10,457,490 B2 | 10/2019 | Nakamoto et al. | |
| 10,464,762 B2 | 11/2019 | Girtman | |
| 10,752,449 B2 | 8/2020 | Aoki et al. | |
| 10,906,742 B2 | 2/2021 | Clucas et al. | |
| 11,130,306 B2 | 9/2021 | Shigeyama et al. | |
| 11,613,436 B2 * | 3/2023 | Hartmann | B65G 47/90 |
| | | | 198/512 |
| 11,667,476 B1 * | 6/2023 | Gil | B65G 67/46 |
| | | | 198/399 |
| 2021/0069902 A1 | 3/2021 | Nakamoto et al. | |

\* cited by examiner

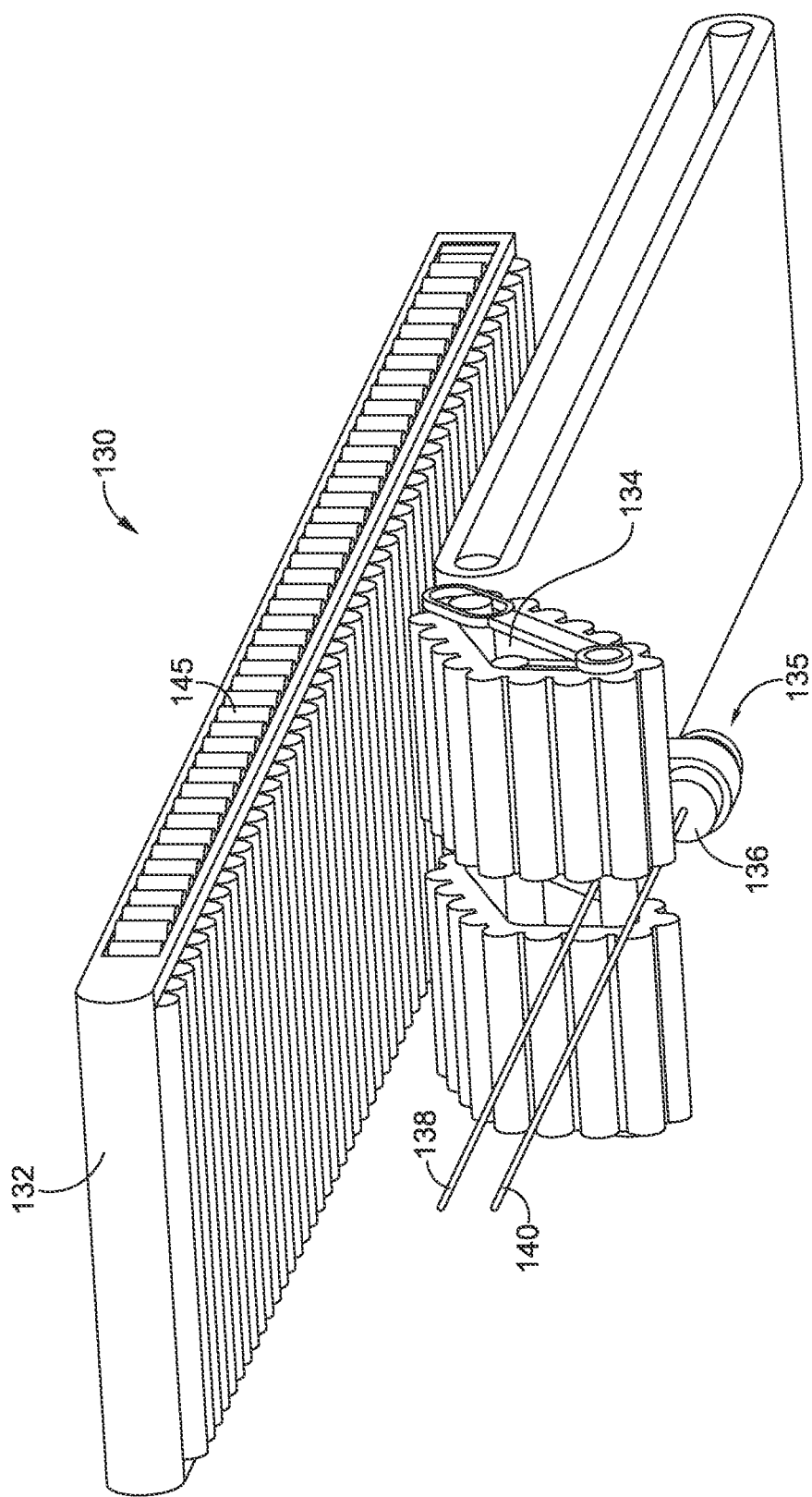

SYSTEMS, METHODS, AND APPARATUSES FOR LOCATING, ENGAGING, AND SHIFTING OBJECTS IN AUTOMATED OR SEMI-AUTOMATED FASHION

CROSS-REFERENCE TO RELATED APPLICATIONS

This application is a continuation of co-pending U.S. patent application Ser. No. 17/553,599, filed Dec. 16, 2021, and titled "Systems, Methods, and Apparatuses for Locating, Engaging, and Shifting Objects in Automated or Semi-Automated Fashion," the contents of which is incorporated herein by reference in the entirety.

TECHNICAL FIELD

The field relates to object handling.

BACKGROUND

Transporting objects, e.g., through a logistics network, presents unique challenges. For example, loading, transporting, and unloading a large volume of objects is often complex and time consuming, and frequently relies on a substantial amount of manual handling. This can, at times, limit the efficiency, capacity, and speed of such operations. Therefore, improvements in automated or semi-automated handling of objects in such environments are needed.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, embodiments that enable automated and/or semi-automated locating, engaging, shifting, and/or organizing of objects, e.g., parcels or packages. These embodiments may be implemented in a logistics network operation, e.g., to allow for automated or semi-automated handling of objects during routing to their different destinations. These embodiments may further be implemented in stationary environments, e.g., inside a facility, and/or in movable environments, e.g., inside a transport vehicle. The implementation of these embodiments may increase the efficiency, capacity, speed, and/or precision of object handling, among other benefits.

In one embodiment disclosed herein, a system for locating, engaging, and shifting objects is provided. The system may include at least a first shifter mechanism and a second shifter mechanism. The first shifter mechanism and the second shifter mechanism may operate at the direction of a control system. The first shifter mechanism and the second shifter mechanism may further be operable in coordination, e.g., being shiftable or adjustable in unison, and/or independently, or some combination of the same, in different aspects. This provides greater adaptability when engaging different objects, e.g., parcels or packages, positioned at random locations in a storage space. The system may also include a detection system. The detection system may include detection components that are operable to locate, identify, and/or determine a size, shape, and/or orientation of objects, and/or otherwise detect different characteristics of objects that are located within a detection distance. These characteristics may include, without limitation, margins, surfaces, heights, widths, and/or depths, and/or surface properties, among other characteristics. Based on the detection process, objects can then be engaged and shifted in automated or semi-automated fashion using the embodiments described herein. In addition to the aforementioned systems, methods of locating, engaging, and shifting objects, and methods of manufacturing the aforementioned systems and components described herein, are provided.

The term "object," as used herein, should be interpreted broadly, to include any one, or combination, of items that may be transported from one location to another. For example, in one non-limiting aspect, an "object" is a parcel or package with contents intended for a particular destination.

The term "logistics network," as used herein, should also be interpreted broadly, to include any one, or combination, of persons, equipment, locations, and/or mobile transports (e.g., vehicles, railway transports, ships, aircraft, and the like, including those that operate autonomously or semi-autonomously) used to route objects to different destinations.

BRIEF DESCRIPTION OF THE DRAWINGS

The embodiments described in this disclosure for use in locating, engaging, and shifting objects in automated or semi-automated fashion are described in detail below with reference to the attached drawing figures, which illustrate non-limiting examples of the subject matter discussed herein, in which:

FIG. 14A depicts part of a system used to locate, engage, and shift objects, in accordance with an embodiment hereof;

DETAILED DESCRIPTION

Figure 1:
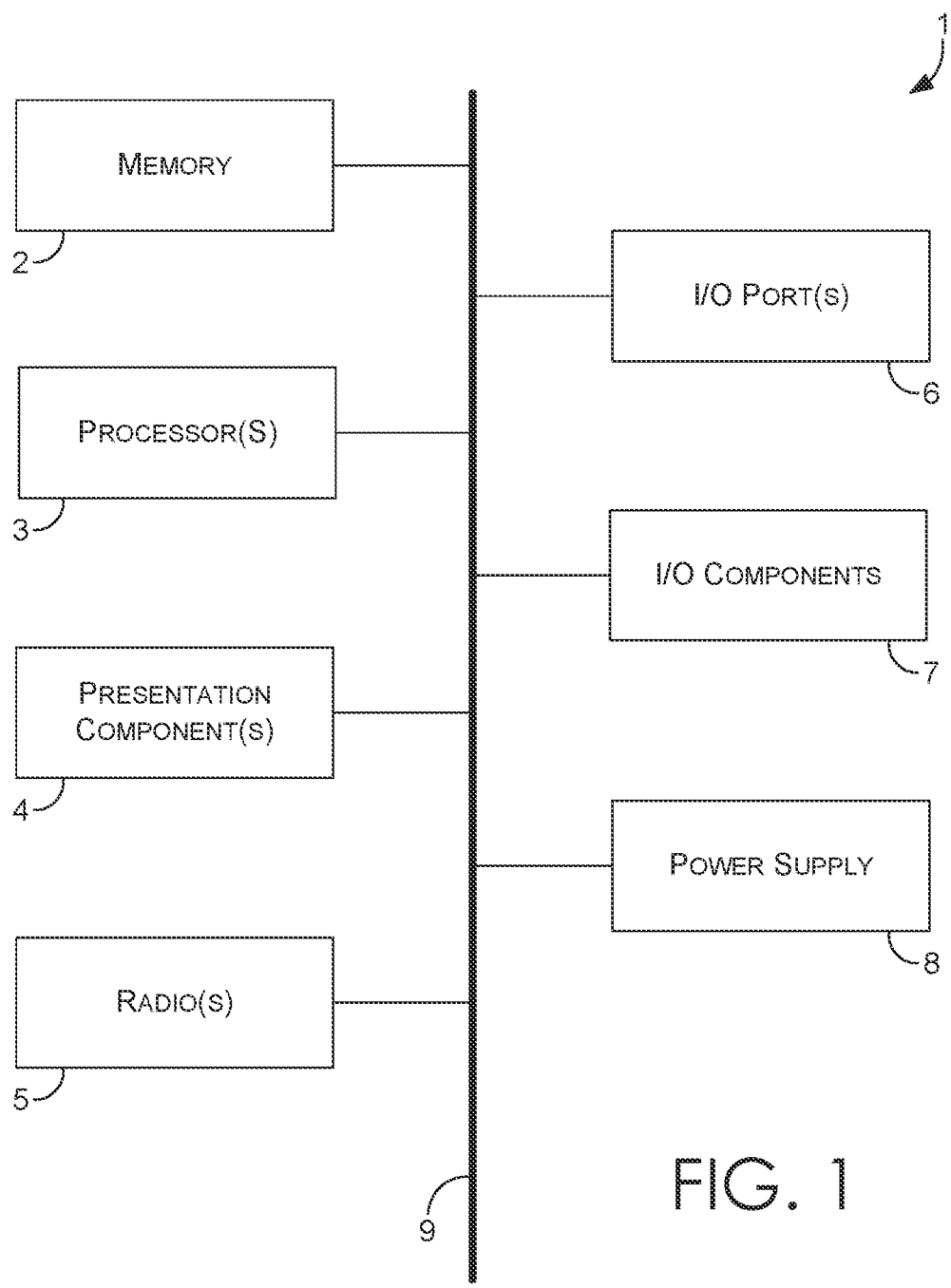
FIG. 1 depicts a computer system suitable for supporting the operation of different embodiments described herein.

This detailed description is provided in order to meet statutory requirements. However, this description is not intended to limit the scope of the invention described herein. Rather, the claimed subject matter may be embodied in different ways, to include different steps, combinations of steps, different elements, and/or different combinations of elements, similar to those described herein, and in conjunction with other present or future technologies. Moreover, although the terms "step" and "block" may be used herein to identify different elements of methods employed, the terms should not be interpreted as implying any particular order among or between different elements except when the order is explicitly stated.

In general, this disclosure describes embodiments that support automated and/or semi-automated locating, engaging, and/or shifting of objects within different environments. In one aspect, a system for shifting objects is provided. The system may further be adapted to unload objects from a storage space, e.g., one located in a vehicle, or in a facility. The system may include a plurality of shifter mechanisms, each of which may include one or more belt-driven mechanisms, actuators, detection components, control components, and/or other components that support operation thereof. The belt-driven mechanisms may be located on multiple sides of each shifter mechanism, e.g., orthogonally-oriented sides, to facilitate efficient shifting in a multiple shifter array that is operated to perform an unloading process, e.g., in a storage space. For example, the belt-driven mechanisms may operate in pairs, in order to manipulate objects from opposing sides, with each pair forming a distinct shifter assembly. In addition, multiple pairs of belt-driven mechanisms may be arranged side-by-side, e.g., along at least part of a width of the storage space where a shifting and/or unloading process occurs. This arrangement allows the belt-driven mechanisms to locate, engage, and shift objects wider than each belt, e.g., through being engaged cooperatively by multiple belts. In such aspects, any number of available pairs of belt-driven mechanisms may be operated in coordination to provide sufficient engagement across a width of an object. The systems described herein may be used to locate objects in the storage space, e.g., that need to be shifted, e.g., unloaded from the storage space for further processing. The system may then be used to adaptively engage and shift the objects as needed, e.g., in accordance with a planned unloading scheme. In addition, methods of locating, engaging, and shifting objects, and methods of manufacturing or assembling systems for the same, are provided herein. Illustrative and non-limiting embodiments are further described below with reference to the attached FIGS. 1-16.

The subject matter described herein may be implemented as a method, a system, and/or a computer-program product or other technology, among other things. Accordingly, certain aspects may take the form of hardware, or software, or may be a combination of software and hardware. A computer-program that includes computer-executable instructions embodied on one or more computer-readable media may also be used. The subject matter may further be implemented as hard-coded into the mechanical design of computing components and/or may be built into a system, apparatus, and/or device for locating, detecting, and shifting objects.

The computer-readable media referenced herein may include volatile media, non-volatile media, removable media, or non-removable media, and may also include media readable by a database, a switch, or various other network devices. Network switches, routers, and related components are conventional in nature, as are methods of communicating using the same, and thus, further elaboration is not provided here. By way of example, and not limitation, computer-readable media may comprise computer storage media and/or non-transitory communications media.

The computer storage media, or machine-readable media, described herein may include media implemented in any method or technology for storing information. Examples of stored information may include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently, and are not limited to the examples provided in this section.

Looking at FIG. 1, a block diagram of an example computing system 1 suitable for supporting operations described herein is provided, in accordance with an embodiment hereof. It should be understood that, although some components depicted in FIG. 1 are shown in the singular, they may be plural, and the components may be connected in a different, e.g., consolidated or distributed, configuration. For example, computing system 1 might include multiple processors and/or multiple radios, among other differences. As shown in FIG. 1, computing system 1 includes a bus 9 that may directly or indirectly connect different components together, including memory 2, processor(s) 3, presentation component(s) 4, radio(s) 5, input/output (I/O) port(s) 6, input/output (I/O) component(s) 7, power supply 8, and/or other components, if used additionally, or alternatively.

The memory 2 may take the form of the memory components described herein. Thus, further elaboration will not be provided here, but memory 2 may include any type of tangible medium that is capable of storing information, such as a database. The database may include any collection of records, data, and/or other information. In one embodiment, memory 2 may include a set of computer-executable instructions that, when executed, perform different functions or steps described herein. These instructions will be referred to as "instructions" or an "application" for short. The processor 3 may actually be multiple processors that may receive instructions and process them accordingly. The presentation component 4 may include a display, a speaker, a screen, a portable digital device, and/or other components that may present information through visual, auditory, and/or other tactile cues (e.g., a display, a screen, a lamp, a light-emitting diode (LED), a graphical user interface (GUI), and/or a lighted keyboard).

The radio 5 may support communications over a network, and may additionally or alternatively facilitate different types of wireless communications, such as Wi-Fi, WiMAX, LTE, Bluetooth, VoIP communications, and/or 5G communications, among other possible communication protocols. In some aspects, the radio 5 may be configured to support multiple technologies, and/or multiple radios may be configured and utilized to support multiple technologies for communication purposes.

The input/output (I/O) ports 6 may take a variety of forms. Example I/O ports may include a USB jack, a stereo jack, an infrared port, a USB-C port, and/or other proprietary or standardized communication ports. The input/output (I/O) components 7 may include one or more keyboards, microphones, speakers, touchscreens, and/or any other device useable to directly or indirectly send inputs into the computing system 1. The power supply 8 may include an electrical source, batteries, generators, fuel cells, and/or any other component(s) that provide power to computing system 1 and any components thereof.

Figure 2:
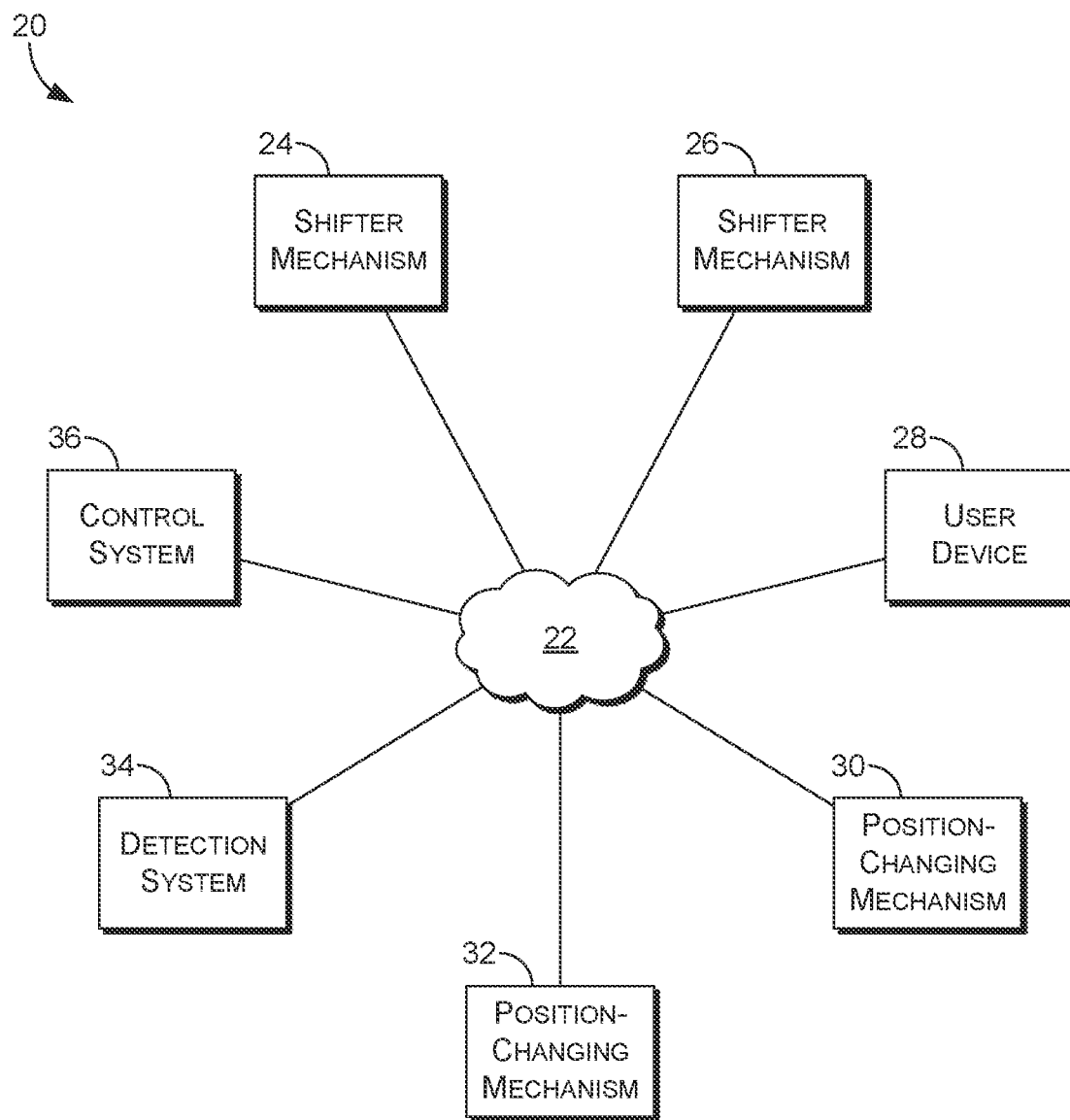
FIG. 2 depicts a network of components adapted to perform operations described herein, in accordance with an embodiment hereof.

Looking now at FIG. 2, a system 20 having a selection of components 24, 26, 28, 30, 32, 34, 36 that are connected through a network 22 is shown, in accordance with an embodiment hereof. The selection of components 24, 26, 28, 30, 32, 34, 36 shown in FIG. 2 can be used to facilitate automated or semi-automated locating, engaging, and shifting, e.g., loading, unloading, or re-organizing, of objects in different environments. FIG. 2 is intended to represent one example selection of components utilized in such a system, but many other selections and combinations are contemplated herein. In addition, the components 24, 26, 28, 30, 32, 34, 36 or others not depicted in FIG. 2 may be configured locally, remotely, or in a distributed configuration, in different aspects.

FIG. 2 depicts a shifter mechanism 24 and a shifter mechanism 26. The shifter mechanisms 24, 26 in different embodiments may be integrated, distinct, and/or some combination thereof. The shifter mechanisms 24, 26 each include components that allow them to engage, support, and shift objects from an original location. For example, in one aspect, each shifter mechanism is a conveyor-type mechanism that may be translatable in an x-direction, a y-direction, a z-direction, or any combination of the same. In this same aspect, the shifter mechanisms 24, 26 may each include one or more belts, rollers, actuators, control components, and/or other components that support their operation. The shifter mechanisms 24, 26 may additionally be directed by a control system 36, as shown in FIG. 2.

FIG. 2 also depicts a user device 28. The user device 28 may be configured to receive user input, present outputs, and/or control components of the system 20, and may be connected to, and operate in connection with, the control system 36 shown in FIG. 2. In one aspect, the user device may be integrated, at least partially, with other components of the system 20, e.g., any of the components 24, 26, 30, 32, 34, 36.

FIG. 2 also depicts a position-changing mechanism 30 and a position-changing mechanism 32. In one embodiment, each position-changing mechanism 30, 32 is coupled to, and/or forms part of, a corresponding one of the shifter mechanisms 24, 26. The position-changing mechanisms 30, 32 may be configured to translate components of the corresponding shifter mechanisms 24, 26 in an x-direction, a y-direction, a z-direction, or any combination of the same. In one embodiment, the position-changing mechanisms 30, 32 may be configured to shift the shifter mechanisms 24, 26 in unison, and/or independently, or both, in any of the x, y, and z directions. The position-changing mechanisms 30, 32 may be connected to, and directed by, the control system 36 shown in FIG. 2.

FIG. 2 also depicts a detection system 34. In one embodiment, the detection system 34 may be connected to, or form part of, the control system 36. The detection system 34 may include any combination of components that allow it to detect, and in some instances identify, an object, including the size, shape, surface characteristics, margins, boundaries, or other aspects of the object. The components of the detection system 34 may be localized or distributed, in different contemplated embodiments. In different embodiments, the detection system 34 may include one or more sensors, scanners, cameras, computing components, including processors and/or memories, or other components that support the detecting, locating, and/or identifying of objects in a three-dimensional space. This may even include components that physically contact objects for detection purposes, in addition to technology-based components that facilitate such detection. The detection system 34 may be connected to, and directed by, the control system 36 shown in FIG. 2.

FIG. 2 also depicts a control system 36. The control system 36 is configured to control, receive feedback from, and/or direct operation of, different components of the system 20. To support such functionality, the control system 36 may be connected to any of the components of the system 20 shown in FIG. 2. The control system 36 may be configured to facilitate detection operations performed by the system 20. The control system 36 may also be configured to perform such operations autonomously or semi-autonomously, e.g., with some degree of user-input or user-control. The components of the control system 36 may additionally be localized, or distributed, in different aspects. The control system 36 may also be configured to communicate with other computing devices over the network 22, e.g., such as a database or central server.

Figure 3:
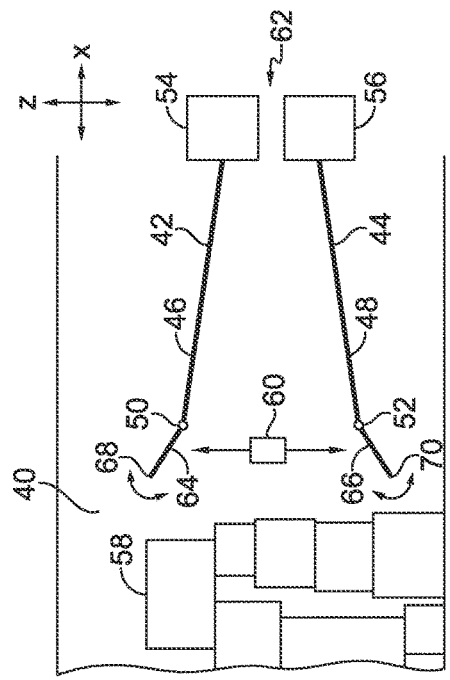
FIG. 3 depicts a generic representation of a system configured to locate, engage, and shift objects, in accordance with an embodiment hereof.

Looking now at FIG. 3, a generic representation of a system 38 adapted for locating, engaging, and shifting objects in a storage space 40 is shown, in accordance with an embodiment hereof. FIG. 3 shows the system 38 positioned, at least partially, inside the storage space 40. In this regard, the system 38 is arranged so that its components can interact with a plurality of objects placed in the storage space 40. The storage space 40 may be located inside a vehicle, e.g., one that operates in a logistics network, with the objects being a plurality of parcels/packages that are being routed to different destinations, among other possible environments.

Looking still at FIG. 3, the system 38 includes a generically-depicted shifter mechanism 42 and a generically-depicted shifter mechanism 44 (the generic depictions are provided for the purposes of simplicity, clarity, and explanation). The shifter mechanisms 42, 44 each include a belt-driven mechanism 46, 48 that extends to a corresponding distal end 50, 52. The distal ends 50, 52 of the shifter mechanisms 42, 44 are repositionable. To facilitate this repositioning, each belt-driven mechanism 46, 48 is coupled to a corresponding position-changing mechanism 54, 56. The position-changing mechanisms 54, 56 are operable to shift the corresponding distal ends 50, 52 of the belt-driven mechanisms 46, 48 to different locations in the storage space 40, e.g., along the x-direction, the y-direction, or the z-direction, or any combination of the same, in different aspects. This shifting of the distal ends 50, 52 may occur in unison, or independently, or a combination thereof, depending on the configuration of the system 38.

Figure 14B:
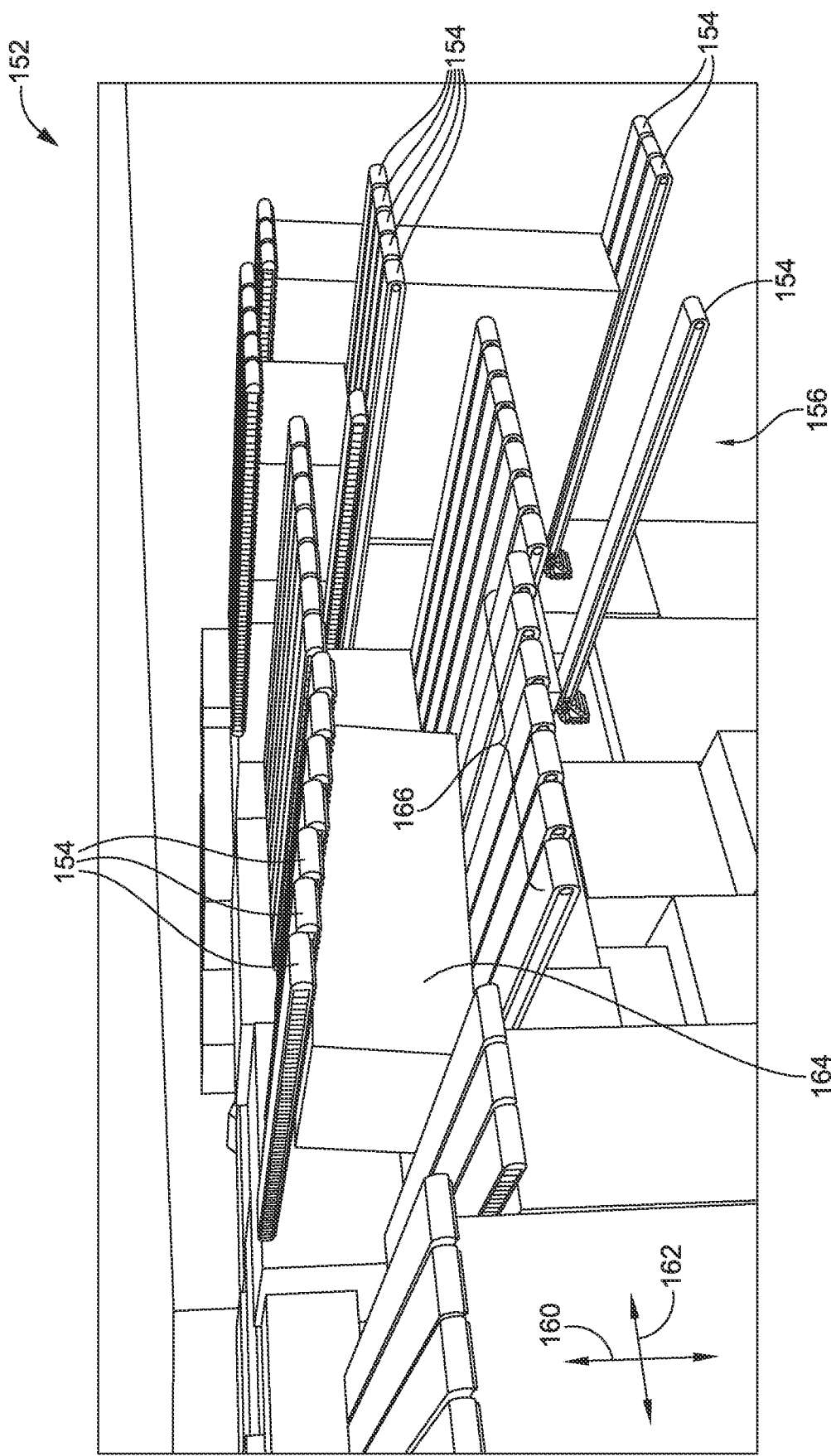
FIG. 14B depicts a system with a plurality of shifter assemblies that operate in coordination to locate, engage, and shift objects in a storage space, in accordance with an embodiment hereof.

In other embodiments, a greater number of shifter mechanisms, e.g., similar to the shifter mechanisms 42, 44 shown in FIG. 3, may be used in coordination and/or with parallel operation, e.g., as depicted in FIG. 14B. For example, looking at the system 38, an array of shifter mechanisms, e.g., like the shifter mechanisms 42, 44, may be arranged across the y-axis as identified in FIGS. 5 and 6. These parallel shifter mechanisms may extend part of the width of the storage space 40, or substantially entirely the width of the storage space 40, in different aspects. In addition, these parallel shifter mechanisms may be configured to translate into/out of the storage space 40, e.g., along the x-axis as identified in FIGS. 5 and 6; may be configured to translate upward and downward, e.g., along the z-axis as identified in FIGS. 3 and 4; and/or may be configured to tilt, pivot, or otherwise re-orient, in certain aspects, to achieve the desired adaptability of engagement. This arrangement allows multiple (e.g., 2, 3, 4, 5, 6, 7, 8, 9, 10 or more) shifter mechanisms to be operated in parallel, including in different combinations, being extended and retracted, e.g., like fingers of a hand, to engage objects of different widths, sizes, and shapes.

In additional aspects, the system 38 and the components thereof may be coupled to a mechanism that allows the entire system 38 to be shifted into, and out of, the storage space 40. The aforementioned mechanism may also be used with the other systems described herein, as well. This additional mobility may allow the shifting systems to be transferred to different storage spaces to perform similar loading, unloading, and/or re-organizing operations in sequence, e.g., in furtherance of a logistics network operation.

To unload objects from the storage space 40, a control system may direct the position-changing mechanisms 54, 56 to shift the distal ends 50, 52 of the belt-driven mechanisms 46, 48 to locations that are adjacent to objects to be handled. For example, one such object 58 is shown in the storage space 40 in FIG. 3. The location of the object 58, and/or the location of its surfaces, margins, and/or contours, may be detected by the system 38, using a generically-represented detection system 60. The detection system 60 may include different combinations of components, either localized or distributed, as described herein. The detection components may further be mounted at different locations about the system 38, to facilitate detection operations. For example, the detection components may be mounted to the belt-driven mechanism 46, the belt-driven mechanism 48, to a frame of the system 38, and/or to another location. The detection operations performed by the detection system 60 allow the distal ends 50, 52 of the belt-driven mechanisms 46, 48 to be repositioned for engaging and shifting objects in the storage space 40, e.g., in support of loading, unloading, or re-organizing such objects. Then, subsequent to each detecting, engaging, and shifting process, the distal ends 50, 52 can again be repositioned to another location adjacent to another object, where the process can then be repeated. This supports automated or semi-automated loading, unloading, and/or re-organizing of objects in a storage space, among other benefits. In some embodiments, the belt-driven mechanisms, e.g., 46, 48, and/or the belts thereof, may maintain a substantially parallel orientation with a surface supporting the objects, e.g., may substantially maintain this orientation throughout a locating, engaging, and shifting operation. This substantially parallel orientation may facilitate increased or maximum contact, e.g., grip and traction, between the belt and the objects being shifted in the storage space.

Figure 4:
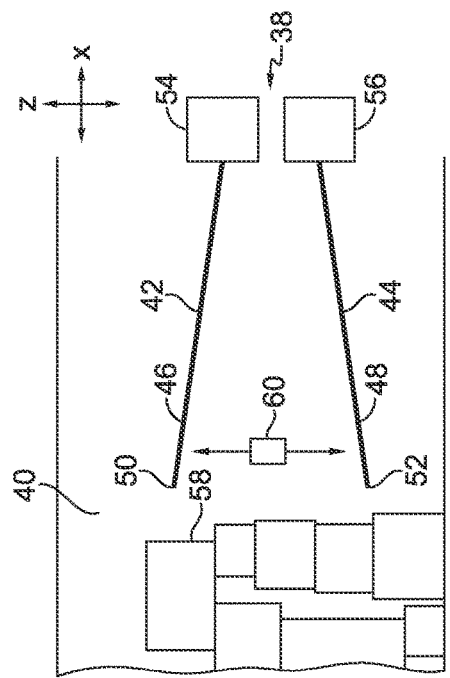
FIG. 4 depicts a generic representation of another system configured to locate, engage, and shift objects, in accordance with an embodiment hereof.

Looking now at FIG. 4, a generic representation of another system 62 adapted for locating, engaging, and shifting objects in a storage space 40 is shown, in accordance with an embodiment hereof. The system 62 shown in FIG. 4 includes a different configuration than the system 38 shown in FIG. 3, e.g., being configured with additional components that provide more degrees of articulation/movement Like the system 38, the system 62 includes a position-changing mechanism 54, a position-changing mechanism 56, a shifter mechanism 42 with a belt-driven mechanism 46 coupled to the position-changing mechanism 54, and a shifter mechanism 44 with a belt-driven mechanism 48 coupled to the position-changing mechanism 56, with each belt-driven mechanism 46, 48 having an associated distal end 50, 52. Notably, in contrast to the system 38 shown in FIG. 3, each distal end 50, 52 of the system 62 has an additional shifter mechanism 64, 66 that extends to a corresponding terminal distal end 68, 70. These additional shifter mechanisms 64, 66 are also adjustable, e.g., pivotal or movable, on or about the distal ends 50, 52. This allows the additional shifter mechanisms 64, 66 to articulate into positions adjacent to objects in the storage space 40. The system 62, like the system 38, includes the detection system 60, which can be used to perform similar locating and detecting processes for components of the system 62. In comparison to the system 38, the addition of the shifter mechanisms 64, 66 allows for greater adaptability in detecting, reaching, and engaging objects, e.g., those of different sizes, shapes, and those at challenging retrieval locations/orientations in the storage space 40.

Figure 5:
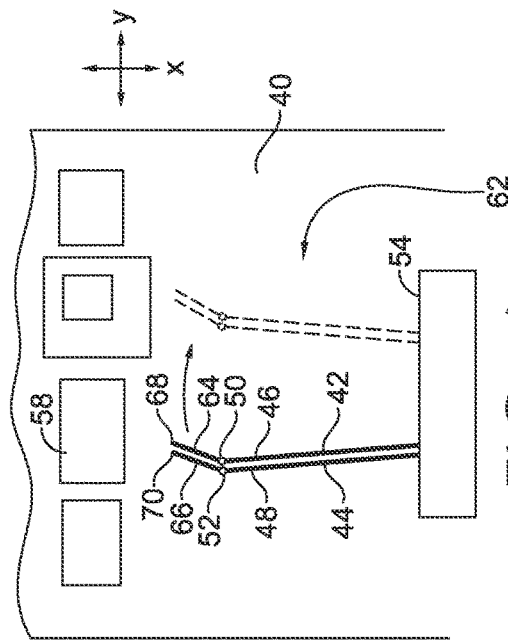
FIG. 5 depicts a different perspective of the system shown in FIG. 3, in accordance with an embodiment hereof.

Looking now at FIG. 5, the system 38 is again shown, but from a different perspective. In particular, FIG. 5 shows a perpendicular orientation compared to FIG. 3. FIG. 3 looks at the system 38 and storage space 40 along the y-axis, as referenced in FIG. 5. FIG. 5 looks at the system 38 and storage space 40 along the z-axis, as referenced in FIG. 3. FIG. 3 illustrates how, during operation of the system 38, the shifter mechanisms 42, 44 are generally positioned above/below one another, e.g., spaced along the z-axis, as shown in FIG. 3. The shifter mechanisms 42, 44 are operable so that one or both of the distal ends 50, 52 is/are shiftable along the z-axis independently of the other of the distal ends 50, 52. This allows the distal ends 50, 52 to displace to match the dimension, e.g., height, of an object that is to be engaged, and shifted. To facilitate the proper displacement of the distal ends 50, 52, the generically-depicted detection system 60 is operated to locate the upper and/or lower margins of an object, e.g., the object 58, allowing the shifter mechanisms 42, 44, and the components thereof, to shift into appropriate positions that allow for engaging the object adjacent those detected margins, for subsequent shifting using the belt-driven mechanisms 46, 48. In different embodiments, the system 38 may be configured so that shifting of the distal ends 50, 52 can occur in unison, or shifting of the distal ends 50, 52 can occur independently, or both, along any of the x, y, and z axes, through actuation of different components coupled to the belt-driven mechanisms 46, 48. For example, FIG. 5 shows how the system 38 is adapted so that the distal ends 50, 52 can be shifted, e.g., in unison, along the y-axis, for placement adjacent to additional objects located in the storage space 40. This shifting is facilitated by the position-changing mechanisms 54, 56, which may be directed by a control system. It should be noted that the degree of unified or independent movement of the components depends on the desired configuration and adaptability of the system 38, e.g., based on the intended object-handling operations.

Figure 6:
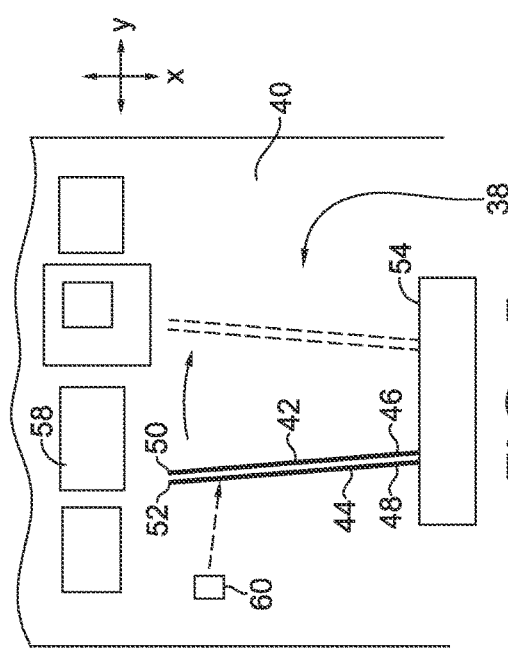
FIG. 6 depicts a different perspective of the system shown in FIG. 4, in accordance with an embodiment hereof.

Looking now at FIG. 6, the system 62 is again shown, but from a different perspective. In particular, FIG. 6 shows a perpendicular orientation compared to FIG. 4. FIG. 4 looks at the system 62 and the storage space 40 along the y-axis, as referenced in FIG. 6. FIG. 6 looks at the system 62 and storage space 40 along the z-axis, as referenced in FIG. 4. FIG. 6 illustrates how, during operation of the system 62, the shifter mechanisms 42, 44, and the shifter mechanisms 64, 66 are generally positioned above/below one another, i.e., spaced along the z-axis, as shown in FIG. 4. The addition of the shifter mechanisms 64, 66 to the system 62 imparts greater degrees of movement/articulation, allowing the terminal distal ends 68, 70 to reach into additional areas or locations in the storage space 40. This may enable loading, unloading, or re-organizing operations to be performed in tighter spaces, or in spaces with more dense configurations of objects, among other possibilities. It can further be seen how the shifter mechanisms 42, 44 and the shifter mechanisms 64, 66 can be shifted independently, e.g., to correspond to the dimensions or margins of an object, or can be shifted in unison, e.g., along the y-axis as shown in FIG. 6, to facilitate handling operations performed in different areas of the storage space 40.

Figure 7:
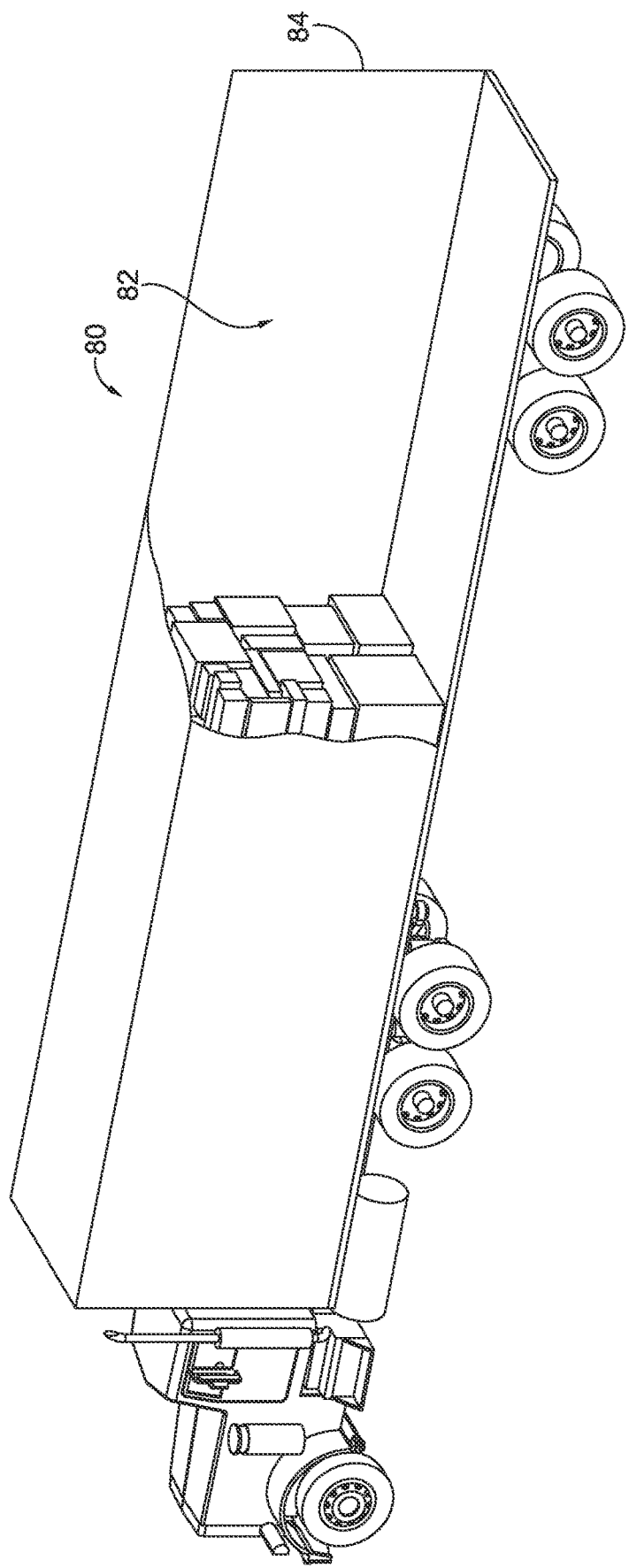
FIG. 7 depicts a storage space inside a mobile transport in which embodiments described herein may be used, in accordance with an embodiment hereof.

Looking now at FIG. 7, a mobile transport 80 that includes a storage space 82 is shown, in accordance with an embodiment hereof. The systems described herein may be utilized in the storage space 82 to load, unload, and/or re-organize objects therein. The mobile transport 80 is depicted as a truck, e.g., a tractor-trailer. However, many other types of mobile transports, such as different vehicles, ships, railway transports, aircraft, and the like, along with stationary locations as well, are possible as environments for the systems described herein to operate. The storage space 82 includes an opening 84 that is located at one end of the mobile transport 80. In different embodiments, the systems used for locating, engaging, and shifting objects may be positioned at or within the opening 84, and used to load or unload a series of objects, e.g., parcels being transported in a logistics network operation. During one operation, a width of the trailer shown in FIG. 7 may be loaded, unloaded, or re-organized using an array of shifting systems similar to those described herein. In such aspects, the shifting systems may be inserted, and begin unloading objects top to bottom. To facilitate efficient processing, the bottom margin of a first object, e.g., box, can be used to identify the top margin of a second object, e.g., another box, on which the first object was resting, and this process repeated until unloading is complete.

Figure 8:
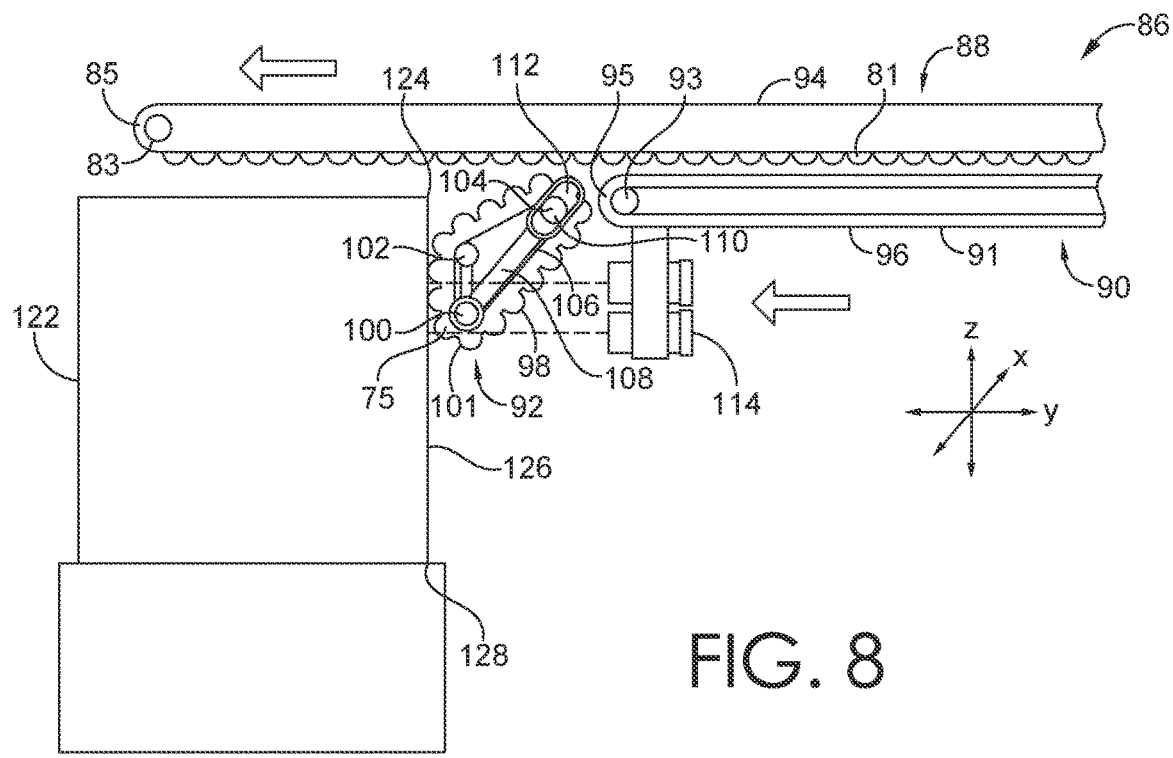
FIGS. 8-13 depict a system being used to locate, engage, and shift objects in a storage space, in accordance with an embodiment hereof.

Looking now at FIG. 8, a system 86 for locating, engaging, and shifting, e.g., in support of loading or unloading, objects in a storage space is shown, in accordance with an embodiment hereof. FIG. 8 in actuality depicts only part of the system 86. The depicted portion shows a shifter mechanism 88, a shifter mechanism 90, and a shifter mechanism 92 that is coupled to the end of the shifter mechanism 90. The shifter mechanisms 88, 90, 92 are configured to operate in coordination to re-position and then adaptively engage and shift objects that are located in a storage space, including objects of different sizes and shapes, and those positioned at random locations and orientations, as discussed further below.

The shifter mechanism 88 includes a belt-driven mechanism 94 that extends to a distal end 85. In the depicted aspect, the distal end 85 is repositionable at different positions through operation of a positioning-changing mechanism (not shown in FIG. 8) that is coupled to the belt-driven mechanism 94, as discussed in FIGS. 3-6. The position-changing mechanism may utilize any combination of mechanical, electrical, pneumatic, and/or hydraulic components to facilitate such shifting, e.g., at the direction of a control system. The belt-driven mechanism 94 includes a belt 81, a plurality of rollers (e.g., roller 83; other rollers are obscured in FIG. 8) over which the belt 81 extends, and one or more actuators (obscured in FIG. 8) that is/are operable to translate the belt 81 over the plurality of rollers in a continuous fashion, to facilitate shifting of engaged objects. The shifter mechanism 90 includes a belt-driven mechanism 96 that extends to a distal end 95. The distal end 95 is repositionable to different locations through operation of a positioning-changing mechanism (not shown in FIG. 8) that is coupled to the belt-driven mechanism 96, as discussed in connection with FIGS. 3-6. The belt-driven mechanism 96 includes a belt 91, a plurality of rollers (e.g., roller 93; other rollers are obscured in FIG. 8), and one or more actuators (not shown in FIG. 8) that is/are operable to translate the belt 91 over the plurality of rollers in a continuous fashion, to facilitate shifting of engaged objects. FIG. 8 shows how the belt 81 and the belt 91 are oriented to, at least in certain sections, face each other. This face-to-face orientation facilitates engaging an object, e.g., a parcel or package, with one or both of the belts 81, 91 (e.g., the latter being a sandwiched configuration) to more securely shift the object to a desired location, e.g., outside of a storage space.

The belts used with the belt-driven mechanisms described herein may be formed with materials that increase frictional engagement, or otherwise increase grip against objects being shifted. For example, if the shifted objects are boxes, a belt made of a material that provides enhanced grip on cardboard may be used. Without limitation, the belts referenced herein may be formed with, or include, rubber (e.g., with bumps or a textured surface, or a degree of adhesion), bristles (e.g., those of formed of plastic, rubber, or another material), micro-needles, or electro-adhesion pads which support increased frictional engagement.

FIG. 8 also depicts how the shifter mechanism 92 is movably coupled to the shifter mechanism 90 at the distal end 95 of the shifter mechanism 90. This allows the shifter mechanism 92 to be pivoted or adjusted to different positions about the distal end 95 of the shifter mechanism 90. This adjustment can be accomplished through use of different couplings, mechanisms, actuators, and/or control components that are integrated between the shifter mechanism 90 and the shifter mechanism 92. For example, a rotational actuator may be integrated between the belt-driven mechanism 96 and a belt-driven mechanism 98 of the shifter mechanism 92, to enable relative movement. In addition, while a single adjustable connection is shown in FIG. 8, in other embodiments, multiple adjustable connections, linkages, or pivot-connections may be utilized, to impart further adaptability and enable even greater articulation.

Looking still at FIG. 8, the belt-driven mechanism 98 of the shifter mechanism 92 includes a belt 101, which extends over a series of rollers 100, 102, 104. The belt-driven mechanism 98 further includes one or more actuators operable to translate the belt 101 over the rollers 100, 102, 104 in a continuous fashion. The actuator(s) is/are obscured in FIG. 8. The shifter mechanism 92, in addition to being adjustable about the distal end 95, is also adjustable through operation of an integrated actuator assembly 106. The actuator assembly 106, when operated, changes the overall geometry, or shape, of the shifter mechanism 92, to more suitably adapt it to certain operations. This is accomplished through adjusting the relative positions of different components, e.g., the rollers 100, 102, and/or 104. This increases the adaptability of the shifter mechanism 92 to different handling operations. For example, in one instance, the shifter mechanism 92 may be adjusted into a geometry that facilitates engaging, acquiring, and/or shifting an object, e.g., by being adjusted into a more elongated shape that allows it to maneuver between, above, or below objects. In another instance, the shifter mechanism 92 is adjustable into a shape that is more suitable for shifting to different locations in a confined storage space, e.g., a more angled, compact shape. In this regard, the actuator assembly 106 can change the geometry of the shifter mechanism 92 as needed for a particular operation.

The actuator assembly 106 shown in FIG. 8 includes an elongated structure 108. The elongated structure 108 is, generally speaking, extendable and retractable, which allows the shifter mechanism 92 to change geometry. Looking at FIG. 8, it can be seen how the elongated structure 108 extends between the roller 100 and a pin 110. The pin 110 is movably positioned within an elongated slot 112. The pin 110 is mounted to, and at least partially confined within, the elongated slot 112. The pin 110 is therefore constrained, at least partially, by the slot 112, while still being movable within the slot 112 to allow for a change in overall geometry of the shifter mechanism 92. The pin 110 is coupled to a linear actuator (not shown in FIG. 8) that extends between the roller 100 and the pin 110. The linear actuator is operable to shift the pin 110 within the slot 112. This shifting of the pin 110 within the slot 112 increases or decreases the distance between the roller 100 and the pin 110, and also between the roller 100 and the roller 104. When this distance is decreased, this produces a more compact geometry of the shifter mechanism 92, e.g., a wedge-like shape. In addition, this geometry positions the belt 101 in greater alignment with the z-axis, which facilitates lifting the object 122, supporting the detection of the bottom margin 128 of the object 122 using the detection system 114, e.g., by rendering the bottom margin 128 more noticeable/detectable. This compact configuration may also be suitable for relocating the shifter mechanism 92 in a compact storage space. When the distance between the roller 100 and the pin 110 is increased, this lengthens or flattens-out the shifter mechanism 92, achieving a geometry that may be more suitable for shifting an object, e.g., one in which all of the rollers 100, 102, 104 are in substantially linear alignment, with a flatter geometry that allows the shifter mechanism 92 to reach under the object 122 so that the belt 101 can translate the object 122 to the shifter mechanisms 88, 90 for further translation in the unloading process. In addition, while not depicted in FIG. 8 or 9, additional shifter mechanisms, similar to those shown, may be operating in parallel to engage the object 122, depending on the number of mechanisms needed to sufficiently engage across the width of the object 122. The linear actuator coupled to the roller 100 and the pin 110 in different embodiments may be mechanically-driven, electrically-driven, electro-mechanically driven, hydraulic, pneumatic, or piezoelectric, or some combination of the same, among other possible configurations, in different embodiments.

The system 86 shown in FIG. 8 further includes a detection system 114. The detection system 114 includes a series of components that are used to detect an object that is proximate to the shifter mechanism 92, e.g., within a detection distance of the detection system 114. The components of the detection system 114 may be localized, e.g., being mounted on the shifter mechanism 92 as shown in FIG. 8, or may be distributed, being positioned at multiple different locations about the system 86, to support a broader detection operation. In use, the detection system 114 can detect objects, e.g., the surfaces and/or margins (edges, boundaries, and/or contours) of such objects, depending on the configuration of the detection system 114.

In one embodiment, the detection system 114 uses a structured light scanning system, e.g., one that uses laser scanning and image capture for object detection.

In another embodiment, the detection system 114 uses a physical-contacting element that extends, retracts, and/or otherwise shifts into contact with an object or a portion thereof to detect its presence, characteristics, and location.

In another embodiment, the detection system 114 uses an imaging device with an optical sensor to detect an object.

In another embodiment, the detection system 114 may use one or more distance-measuring lasers to detect the presence, absence, or distance to an object located within a detection distance.

In another embodiment, the detection system 114 uses a rotation sensor located between the shifter mechanism 90 and the shifter mechanism 92 to detect the presence of an object. The rotation sensor is used to detect a rotational resistance to the pivoting motion imparted to the shifter mechanism 92 by a rotational actuator located between the shifter mechanisms 90, 92. This detected resistance can be used to determine if the shifter mechanism 92 is/is not in contact with an object. For example, a higher rotational resistance indicates contact with an object.

In another embodiment, the detection system 114 may utilize tactile pressure sensors, e.g., a MEMS barometric pressure sensor, or a plurality of the same arranged to provide a pressure-sensing grid array.

In another embodiment, the detection system 114 may have at least some detection components on the actual shifter mechanism 92 as shown in FIG. 8, so that when the shifter mechanism 92 is repositioned, the detection components shift with it, to support further localized detection. FIG. 8 depicts an imaging-based detection system, but in any of the embodiments described herein, other detection systems may be used.

It should be noted that any of the aforementioned detection systems and associated components may be integrated and used with any of the shifting systems, or shifter mechanisms, described herein throughout this disclosure.

FIG. 8 shows the beginning of a process of locating, engaging, and shifting, e.g., unloading, objects from a storage space. FIGS. 9-13 depict subsequent parts of the aforementioned process. It should be noted that different variations of this process are contemplated herein, as are use of different systems to facilitate the same. FIGS. 8-13 are intended to represent only one example process.

FIG. 8 depicts the shifter mechanism 88 and the coupled shifter mechanisms 90, 92 in tandem being shifted into position to locate, engage, and ultimately shift/unload an object 122 from the storage space. FIG. 8 specifically shows the shifter mechanisms 88, 90, 92 being translated along the y-axis as identified in FIG. 8, so that their respective distal ends 75, 85 are placed adjacent to the object 122. The translation of the shifter mechanisms 88, 90, 92 may be enabled by one or multiple position-changing mechanisms (not shown in FIG. 8) coupled to the shifter mechanisms 88, 90, 92. For example, all of the shifter mechanisms 88, 90, 92 may be coupled to one consolidated position-changing mechanism, or each may be individually coupled to a corresponding position-changing mechanism, in different aspects. The position-changing mechanism(s) may include couplings, actuators, mechanisms, sensors, control components, or other components that allow them to translate the shifter mechanisms 88, 90, 92 in different directions, e.g., any one or combination of the x, y, and z-axes shown in FIG. 8, depending on the configuration. FIG. 8 shows how the shifter mechanism 88 is positioned on one side of the object 122, e.g., adjacent a top or upper margin 124 of the object 122. The distal end 75 of the shifter mechanism 92 that pivotally extends from the shifter mechanism 90 is also translated into a position adjacent to a surface 126 of the object 122. The initial positioning of these components facilitates further detection of the object 122, e.g., the surfaces and margins thereof, subsequently allowing the shifter mechanisms 88, 90, 92 to be operated to engage the object 122.

Figure 9:
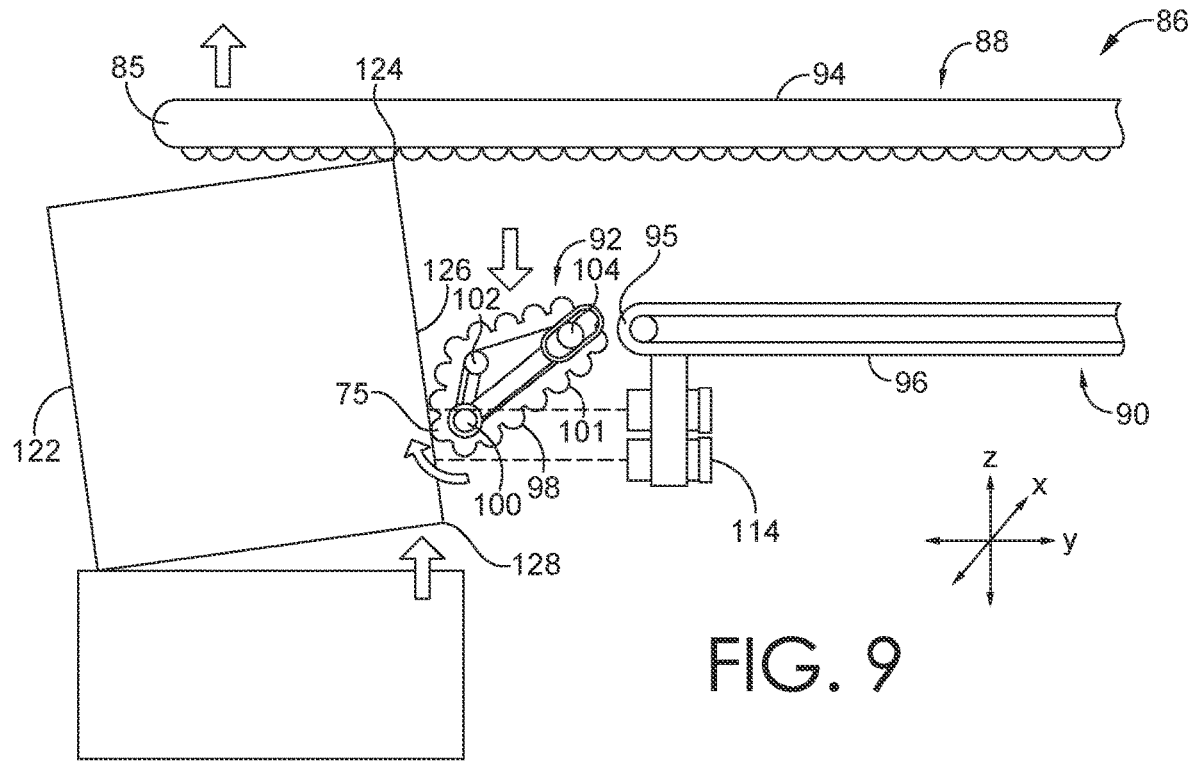

Looking now at FIG. 9, the process described in connection with FIG. 8 is continued. In particular, FIG. 9 depicts the system 86 performing a detection process, using the detection system 114, to locate one or more margins, edges, surfaces, contours, or other features of the object 122. This detection process allows the shifter mechanisms 88, 90, 92 to be adaptively adjusted to engage the object 122, even when the object 122 is of an unknown size, shape, or at an unknown location or orientation in the storage area. FIG. 9 shows the shifter mechanism 92 being shifted in tandem with the shifter mechanism 90 along the z-axis, away from the shifter mechanism 88. This highlights how the shifter mechanisms 90, 92 are translatable in unison, and independently from the shifter mechanism 88. This allows for adaptable positioning that is based on the size, shape, orientation, and location of the object 122.

Looking still at FIG. 9, while the shifter mechanisms 90, 92 are translated along the z-axis, the detection system 114 performs a detection process in the direction of the object 122. The detection system 114 may be configured with any type of vision-based, tactile-based, acoustic-based, and/or electronic-based detection components, non-limiting examples of which are described in the preceding sections. In FIG. 9, in addition to translating along the z-axis, the shifter mechanism 92 is being pivoted clockwise, e.g., through operation of a rotational actuator coupled between the shifter mechanisms 90, 92, and the belt-driven mechanism 98 is translating the belt 101 over the rollers 100, 102, 104 in the clockwise direction, to facilitate shifting of the object 122 toward the shifter mechanisms 88, 90, e.g., to facilitate transfer in an unloading direction.

The rotational movement of the shifter mechanism 92 during translation along the z-axis may achieve several effects. First, in one instance, this may help position the belt-driven mechanism 98 adjacent to the surface 126, and/or under a bottom margin 128 of the object 122, to facilitate engagement with the shifting mechanism 88, as shown in FIG. 9. The pivoting of the shifter mechanism 92 during translation along the z-axis may also help detect the bottom margin 128 of the object 122, e.g., particularly if a rotational force sensor is used, instead of cameras/imaging/scanning devices, as shown with the detection system 114. In one instance, a change in rotational force resistance may be correlated with a bottom margin 128 of the object 122, from which the shifting mechanism 92 may be further pivoted, or adjusted to change its geometry, to facilitate engaging the object 122.

Figure 10:
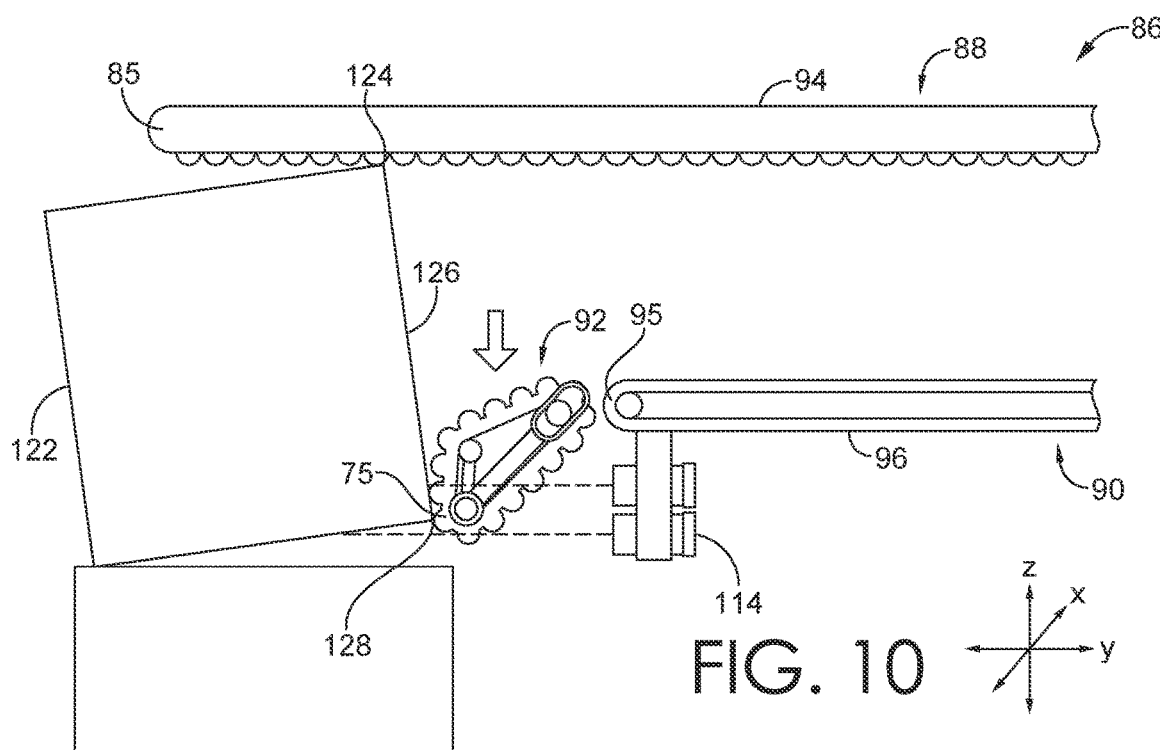

Looking now at FIG. 10, the system 86 is again shown, but with the shifter mechanisms 90, 92 further displaced from the shifter mechanism 88 along the z-axis, as identified in FIG. 10. In FIG. 10, the distal end 75 of the shifter mechanism 92 is located approximately adjacent a bottom margin 128 of the object 122, which is being detected by the detection system 114. In addition, the clockwise rotation of the shifter mechanism 92 causes the distal end 75 to engage and lift, generally speaking, the bottom margin 128 of the object 122, beginning the process of engaging and translating the object 122 toward an unloading direction along the y-axis as shown in FIG. 10. In addition, the lifting of the object 122 allows for a better detection/recognition of the bottom margin 128. For example, to illustrate one aspect, when twin sensors configured for distance detection are used with the detection system 114, these sensors during detection of the bottom margin 128 may report different distances, e.g., one detecting the distance above the bottom margin 128, and one detecting the distance below the bottom margin 128, which can be used to determine the location of the bottom margin 128. When optical sensors are instead used, such lifting may also facilitate detection, e.g., when the bottom surface of the object 122 becomes visible.

Figure 11:
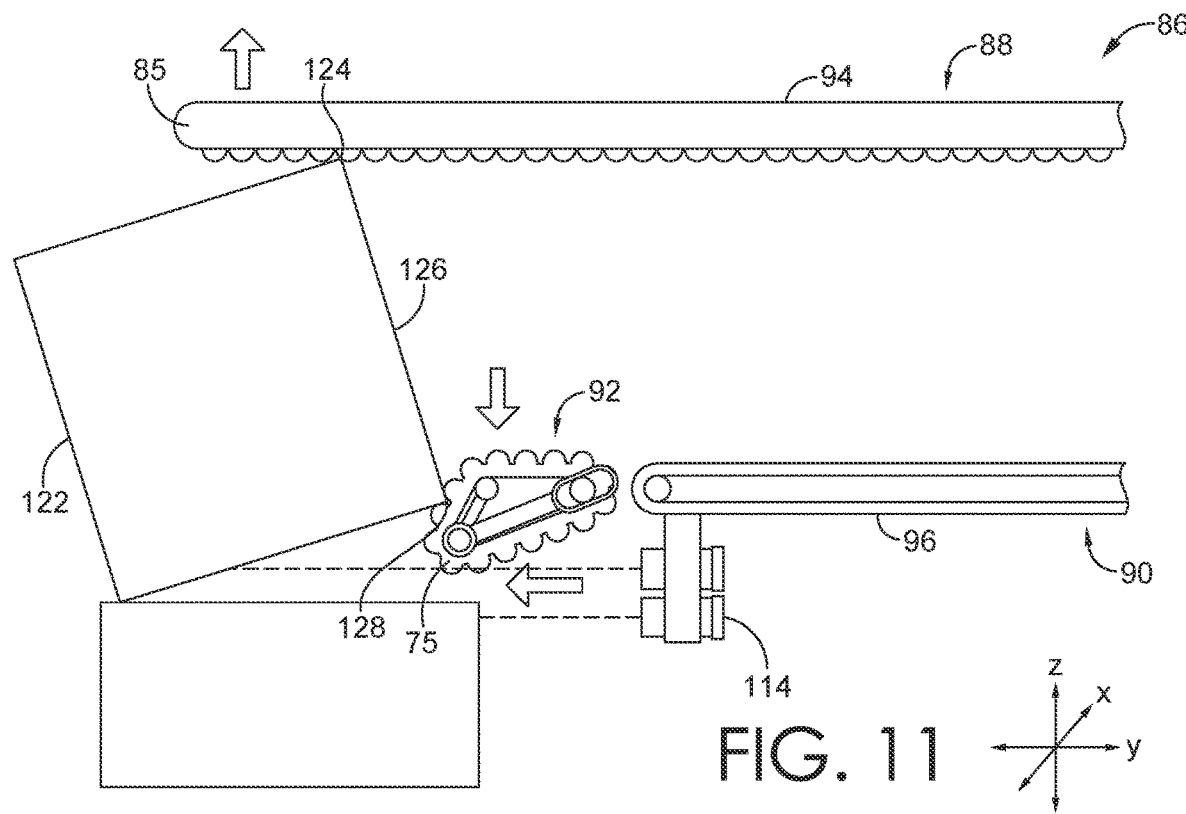

Looking now at FIG. 11, the system 86 is again shown, but with the shifter mechanisms 90, 92 further displaced from the shifter mechanism 88 along the z-axis, as identified in FIG. 11, and with the shifter mechanism 92 further pivoted clockwise to facilitate engagement with the object 122. FIG. 11, in particular, shows the point at which the shifter mechanism 92 has reached the bottom margin 128 of the object 122, and is further reaching under the object 122. In this circumstance, either the bottom margin 128 has been identified by the detection system 114, or the pivoting of the shifter mechanism 92 continues until a counteracting force imparted by the object 122 changes, e.g., indicating that the shifter mechanism 92 is no longer contacting the surface 126 of the object 122, but rather is positioned under the bottom margin 128 of the object 122. FIG. 11 further shows how the shifter mechanisms 88, 90, 92 may translate along the y-axis, to surround the object 122, in order to facilitate engaging and shifting the object 122.

Looking now at FIGS. 12 and 13, which again depict the system 86, it can be seen that the actuator assembly 106 internal to the shifter mechanism 92 has been operated, shifting the pin 110 along the slot 112, and as a result lengthening, and generally flattening-out, the shifter mechanism 92. This achieves a more suitable geometry for inserting the shifter mechanism 92 under the object 122, past the bottom margin 128 thereof. The operation of the actuator assembly 106 internal to the shifter mechanism 92 may be directed by a control system that also directs operation of the shifter mechanism 88, the shifter mechanism 90, the shifter mechanism 92, the detection system 114, and/or any of the coupled position-changing mechanisms, as discussed in earlier sections.

Figure 12:
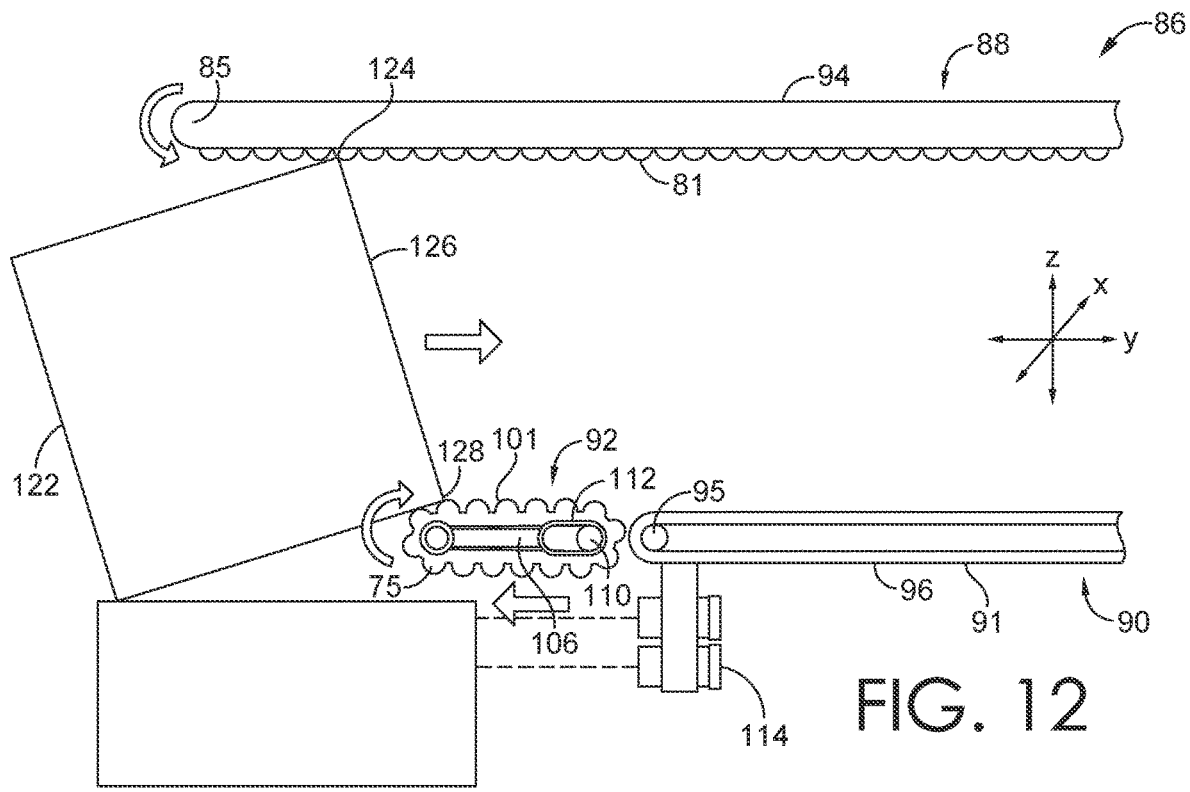
Figure 13:
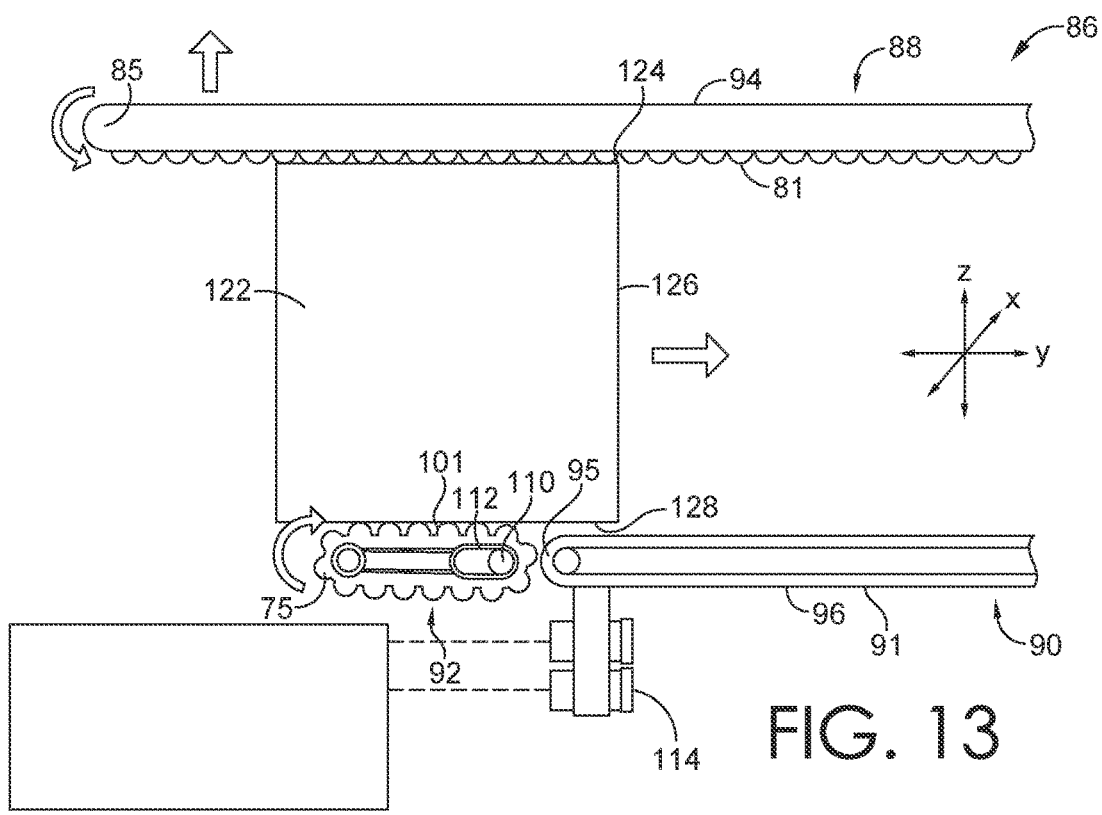

FIG. 12 shows how the distal end 75 of the shifter mechanism 92 is inserted under the object 122 while the shifter mechanism 92 is in the flattened geometry, with the belt 101 rotating in the clockwise direction. In some instances, the shifter mechanisms 90, 92 may be shifted along the x-axis, the y-axis, and/or the z-axis, and/or the shifter mechanism 88 may be shifted along the x-axis, the y-axis, and/or the z-axis, as needed, to facilitate engagement with the object 122 and translation of the object 122, as shown in FIGS. 12 and 13. Throughout this engagement process, the belts 81, 91, 101 of the shifter mechanisms 88, 90, 92, some of which face towards each other, are translated over their respective rollers to help pull the object 122 towards an unloading direction. In other words, the belts 81, 91, 101 translate to pull in a common direction, e.g., clockwise for belts 91, 101, and counter-clockwise for belt 81, relative to FIGS. 12 and 13, while sometimes "pinching" the object 122 during the shifting process, to facilitate grip. Looking at FIG. 12, it can also be seen how, in the adjusted geometry, the belt 101 of the shifter mechanism 92 is generally flat, and substantially parallel with the belt 81 of the shifter mechanism 88. This allows the belts 81, 101 to simultaneously contact the object 122 and translate it along the y-axis, e.g., towards an unloading direction. In some aspects, the shifter mechanisms 88, 90, 92 may be used to hold objects, in addition to transferring objects, to facilitate a sequenced unloading operation.

The process described in connection with FIGS. 8-13 can be performed in a continuous fashion in a storage space until all objects are engaged and shifted, e.g., unloaded or re-organized. In addition, subsequent to each locating, engaging, and shifting process, the position-changing mechanism(s) coupled to the shifter mechanism 88 and to the shifter mechanisms 90, 92 may be operated to reposition the distal ends 75, 85, e.g., along the x-axis, y-axis, and/or z-axis, as identified in FIGS. 8-13, allowing additional objects to be manipulated. In addition, using the adaptive process described in connection with FIGS. 8-13, objects of different shapes, sizes, and orientations can be manipulated with limited reconfiguration of equipment, due to the adaptability of the components of the system 86. It should be noted that multiple elements of the system 86, e.g., the shifter mechanisms 88, 90, may operate in coordination, e.g., at the direction of a control system coupled to each of the components/systems.

Looking now at FIG. 14A, a different perspective of a system 130 used for locating, engaging, and shifting objects is shown, in accordance with an embodiment hereof. In FIG. 14A, it can be seen that the system 130 includes a shifter mechanism 132 and a shifter mechanism 134 which are displaceable to engage objects of different sizes. These shifter mechanisms 132, 134, as discussed in other sections, may be configured to operate in coordination, e.g., at the direction of a control system. In addition, while not shown, each shifter mechanism 132, 134 may be coupled to a common or corresponding position-changing mechanisms that is/are operable to reposition the shifter mechanisms 132, 134 at different locations, in unison or independently, to facilitate continuous operation, e.g., during an unloading process, as discussed herein. In addition, the shifter mechanism 132 includes a belt-driven mechanism and the shifter mechanism 134 includes a belt-driven mechanism, which generally face towards each other. FIG. 14A also shows how the shifter mechanism 132 includes similar side-facing belt-driven mechanisms. This orthogonal arrangement of the belt-driven mechanisms may help facilitate object shifting when multiple systems 130 are used side-by-side in a storage space to unload objects.

The system 130 further includes a detection system 135 that includes a detection component 136 used to detect an object, or features thereof, within a detection distance, or to detect the absence of an object. The detection component 136 shown in FIG. 14A is represented as a pair of physical-contacting elements 138, 140. The physical-contacting elements 138, 140 may be extendable, retractable, pivotal, or otherwise adjustable to facilitate detecting an object, e.g., a margin or surface thereof, through physical engagement with the physical-contacting elements 138, 140. In one instance, the physical-contacting elements 138, 140 may be a pair of "antennae," e.g., that are rigid, or flexible, or some combination of the same, and which during operation are extended and retracted through a belt of the shifter mechanism 134, as shown in FIG. 14A. The differences in the ability of the physical-contacting elements 138, 140 to extend outward at any given point may be used to determine where objects are located and where gaps between objects are located.

Looking now at FIG. 14B, another system 152 that includes a plurality of shifter mechanisms 154 configured to operate in coordination, e.g., in different combinations, to locate, engage, and shift objects in a storage space 156, is shown, in accordance with an embodiment hereof. The shifter mechanisms 154 are shown in isolation in FIG. 14B, without other components attached, for clarity. The system 152 is located in the storage space 156 which has a vertical axis 160 and a horizontal axis 162. In the system 152 shown in FIG. 14B, the plurality of shifter mechanisms 154 (only some of which are identified for clarity) are arranged horizontally, e.g., across a width of the storage space 156, extending along the axis 162. The shifter mechanisms 154 are operable in coordination, e.g., vertically as pairs that shift along the axis 160 to facilitate engaging an object. In such instances, each pair may form a distinct shifter assembly. The shifter mechanisms 154 may also be operable in coordination horizontally along the axis 162. During a shifting, loading, and/or unloading operation, a selected number of shifter mechanisms 154 may be operated in coordination to engage and shift objects based on a width or size of those objects exceeding that of a single shifter mechanism 154. FIG. 14B shows an object 164 being shifted by multiple vertically-spaced pairs 166 of shifter mechanisms 154. This coordinated operation of different combinations of shifter mechanisms 154 allows them to be used adaptively, e.g., like fingers of a hand, to locate, engage, and shift objects of different widths, shapes, and sizes. The shifter mechanisms 154, including different combinations thereof, may directed by a common control system.

Figure 15:
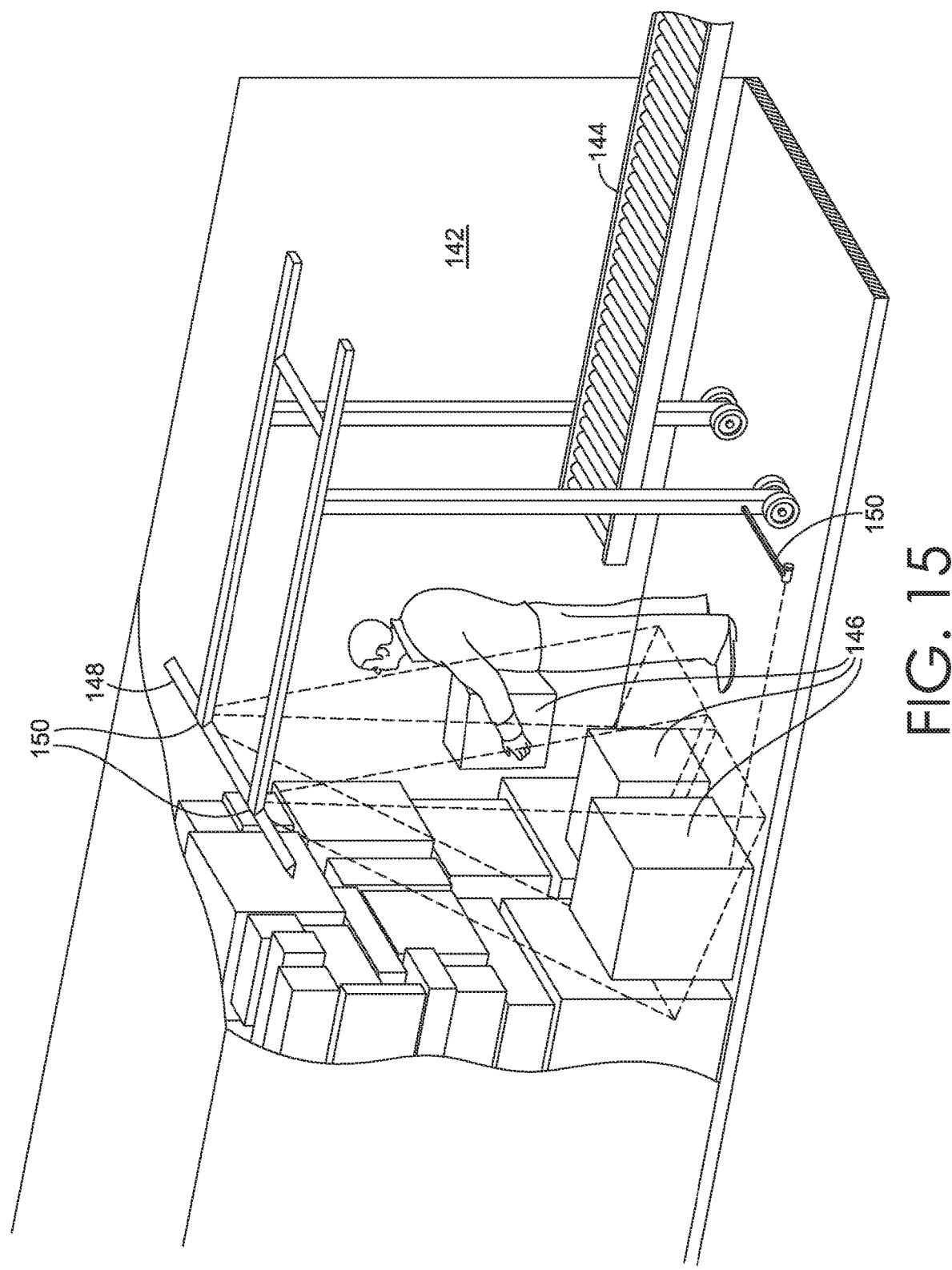
FIG. 15 depicts an operation for determining an arrangement of objects in a storage space, in accordance with an embodiment hereof.

Looking now at FIG. 15, a loading and detection operation being performed in a storage space 142 is shown, in accordance with an embodiment hereof. In one embodiment, the storage space 142 is located in a vehicle, e.g., inside the trailer of a tractor-trailer. In another embodiment, the storage space is located in a stationary location, e.g., the inside of a shipping facility. The storage space may be associated with a logistics network operation, among other possible object-processing environments.

FIG. 15 depicts an overall loading operation, i.e., a process that results in a plurality of objects 146 supplied by an object-advancing apparatus 144 being loaded into the storage space 142. This process may facilitate the routing of objects from one location to another location, e.g., in a logistics network. FIG. 15 further shows a detection system 148 located in the storage space 142. The detection system 148 is depicted with a non-limiting selection of detection components 150 positioned at different locations/orientations. For example, some detection components 150 are positioned for top-down scanning, to support accurate capture during a loading operation, and others are positioned to the side, and/or at ground level, to capture additional perspectives.

The detection system 148 shown in FIG. 15 may be used to capture object-related information at different stages of the loading process. For example, as each layer of objects 146 is loaded into the storage space 142, the detection system 148 may capture images, or acquire other data, and store such images and/or data for use in later operations. This capture may include two-dimensional images and/or scans, or three-dimensional images and/or scans. This information may be used to track the location, orientation, or grouping of different objects 146 loaded into the storage space 142. This information can also be used in downstream processing operations. For example, the information can be communicated to a downstream operational point in a logistics network operation, and then be used to generate a sequence or plan for the subsequent unloading operation performed by the locating, engaging, and shifting systems at that location. The information can also be used to determine which objects require special handling, e.g., special equipment, or manual handling, and at which stage or time in the unloading operation this need may be required, for planning and scheduling purposes. Overall, this information can be used for multiple advantageous purposes, including planning an unloading operation, identifying exceptions in the unloading process, e.g., that require human operators or special equipment, identifying objects that require unique handling, predicting a time at which objects will be manipulated and/or unloaded, providing schematics or diagrams of a loaded storage space, and additionally, using the data for training algorithms based on human behavior, e.g., through artificial intelligence or machine-based learning.

Figure 16:
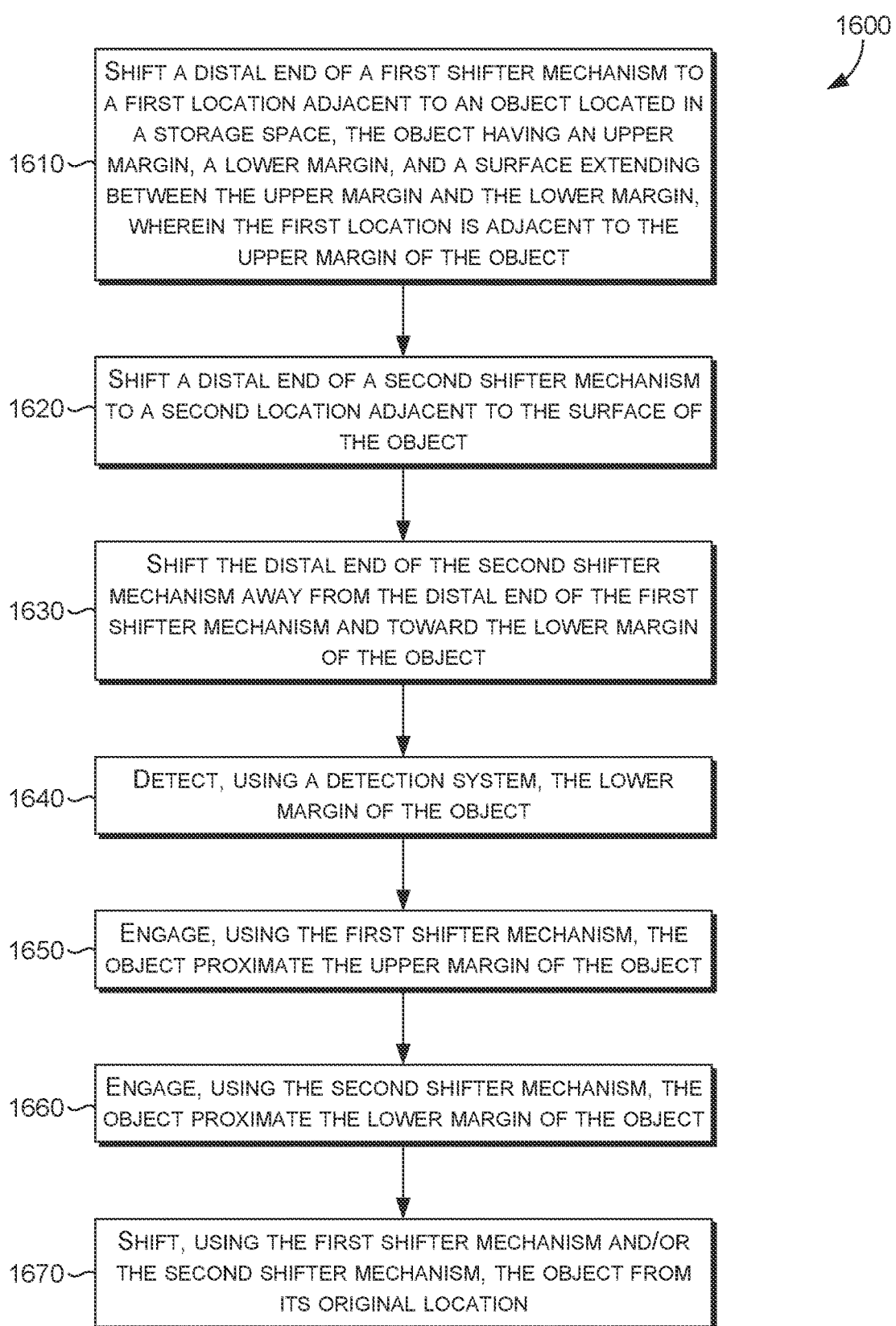
FIG. 16 depicts a block diagram of a method for locating, engaging, and shifting objects, in accordance with an embodiment hereof.

Referring now to FIG. 16, a block diagram of an example method 1600 of unloading objects from a storage space using a first shifter mechanism, e.g., the shifter mechanism 42 shown in FIG. 3, a second shifter mechanism, e.g., the shifter mechanism 44 shown in FIG. 3, and a detection system, e.g., the detection system 60 shown in FIG. 3, that are operable in coordination, e.g., simultaneously, in unison, and/or individually in different aspects, is provided, in accordance with an embodiment hereof. The method includes, but is not limited to, blocks 1610-1670, shown in FIG. 16. In block 1610, the method includes shifting a distal end, such as the distal end 85 shown in FIG. 8, of the first shifter mechanism to a first location adjacent to an object located in the storage space, e.g., the object 122 shown in FIG. 8. The object may include an upper margin, e.g., the top or upper margin 124 shown in FIG. 8, a lower margin, e.g., the bottom margin 128 shown in FIG. 8, and a surface, e.g., the surface 126 shown in FIG. 8, extending between the upper margin and the lower margin. The first location may be adjacent to the upper margin of the object. In block 1620, the method includes shifting a distal end of the second shifter mechanism, e.g., the distal end 75 shown in FIG. 8, to a second location adjacent to the surface of the object. In block 1630, the method includes shifting the distal end of the second shifter mechanism away from the distal end of the first shifter mechanism and toward the lower margin of the object. In block 1640, the method includes detecting, using the detection system coupled to the second shifter mechanism, the lower margin of the object. In block 1650, the method includes engaging, using the first shifter mechanism, the object proximate the upper margin of the object. In block 1660, the method includes engaging, using the second shifter mechanism, the object proximate the lower margin of the object. In block 1670, the method includes shifting, using at least the second shifter mechanism, the object from its original location.

Embodiment 1. A system for engaging and shifting objects in a storage space, the system comprising a first belt-driven mechanism having a distal end; a first position-changing mechanism coupled to the first belt-driven mechanism and operable to shift the distal end of the first belt-driven mechanism to a plurality of different positions; a second belt-driven mechanism having a distal end; a second position-changing mechanism coupled to the second belt-driven mechanism and operable to shift the distal end of the second belt-driven mechanism to a plurality of different positions; a third belt-driven mechanism pivotally coupled to the distal end of the second belt-driven mechanism through a rotational actuator, the rotational actuator operable to pivot the third belt-driven mechanism to a plurality of different positions; and a detection system coupled to at least the third belt-driven mechanism, wherein the detection system is operable to detect at least one margin of an object located within a detection distance of the detection system, and wherein the first belt-driven mechanism, the second belt-driven mechanism, and the third belt-driven mechanism are operable in coordination.

Embodiment 2. The system of embodiment 1, wherein the detection system comprises a structured light scanning system.

Embodiment 3. The system of embodiment 1 or 2, wherein the detection system comprises a contact element that is extendable and retractable.

Embodiment 4. The system of any of embodiments 1-3, wherein the detection system comprises at least one optical sensor coupled to a processor.

Embodiment 5. The system of any of embodiments 1-4, wherein the detection system comprises a sensor coupled to the rotational actuator, wherein the sensor detects a level of resistance in response to a rotational force applied by the rotational actuator.

Embodiment 6. The system of any of embodiments 1-5, wherein the first position-changing mechanism is operable to shift the first belt-driven mechanism in each of an x-direction, a y-direction, and a z-direction, and wherein the second position-changing mechanism is operable to shift the second belt-driven mechanism in each of the x-direction, the y-direction, and the z-direction.

Embodiment 7. The system of any of embodiments 1-6, wherein the first belt-driven mechanism and the second belt-driven mechanism are shiftable in unison in at least one of the x-direction, the y-direction, and the z-direction, and wherein the first belt-driven mechanism and the second belt-driven mechanism are shiftable independently in at least one of the x-direction, the y-direction, and the z-direction.

Embodiment 8. The system of any of embodiments 1-7, wherein the first belt-driven mechanism, the second belt-driven mechanism, and the third belt-driven mechanism each include at least one belt comprising textured rubber; bristles; micro-needles; or electro-adhesion pads.

Embodiment 9. A method of unloading objects from a storage space using a first shifter mechanism, a second shifter mechanism, and a detection system that are together operable in coordination, the method comprising shifting a distal end of the first shifter mechanism to a first location adjacent to an object located in the storage space, the object having an upper margin, a lower margin, and a surface extending between the upper margin and the lower margin, wherein the first location is adjacent to the upper margin of the object; shifting a distal end of the second shifter mechanism to a second location adjacent to the surface of the object; shifting the distal end of the second shifter mechanism away from the distal end of the first shifter mechanism and toward the lower margin of the object; detecting, using the detection system, the lower margin of the object; engaging, using the first shifter mechanism, the object proximate the upper margin of the object; engaging, using the second shifter mechanism, the object proximate the lower margin of the object; and shifting, using the first shifter mechanism and/or the second shifter mechanism, the object from its original location.

Embodiment 10. The method of embodiment 9, further comprising shifting a third shifter mechanism coupled to the distal end of the second shifter mechanism into engagement with the object prior to engaging the object with the second shifter mechanism, and shifting, using the third shifter mechanism, the object into contact with the second shifter mechanism.

Embodiment 11. The method of embodiment 9 or 10, wherein, prior or simultaneously to engaging the object, the third shifter mechanism is adjusted from a first geometry to a second geometry, the first geometry defining a first length of the third shifter mechanism, and the second geometry defining a second length of the third shifter mechanism, the second length being greater than the first length.

Embodiment 12. The method of any of embodiments 9-11, further comprising, subsequent to shifting the object from its original location, shifting the distal end of the second shifter mechanism toward the distal end of the first shifter mechanism along a first axis; and shifting the distal end of the first shifter mechanism and the distal end of the second shifter mechanism in unison along a second axis that is perpendicular to the first axis to position the distal end of the first shifter mechanism and the distal end of the second shifter mechanism adjacent a separate object located in the storage space.

Embodiment 13. A system for locating, engaging, and unloading objects from a vehicle, the system comprising a first shifter mechanism, comprising a first belt-driven mechanism extending to a first distal end and comprising a first belt, a first plurality of rollers, and a first actuator operable to translate the first belt over the first plurality of rollers in a continuous fashion; a first position-changing mechanism coupled to the first belt-driven mechanism and operable to translate the first belt-driven mechanism in at least one of an x-direction, a y-direction, and a z-direction; a second shifter mechanism, comprising a second belt-driven mechanism that extends to a second distal end and comprising a second belt; a second plurality of rollers, and a second actuator operable to translate the second belt over the second plurality of rollers in a continuous fashion; a second position-changing mechanism coupled to the second belt-driven mechanism and operable to translate the second belt-driven mechanism in at least one of an x-direction, a y-direction, and a z-direction; and a third shifter mechanism, comprising a third belt-driven mechanism extending to a third distal end, the third belt-driven mechanism pivotally coupled to the second distal end through a rotational actuator operable to pivot the third belt-driven mechanism about the second distal end, the third belt-driven mechanism comprising a third belt; a third plurality of rollers, a third actuator operable to translate the third belt over the third plurality of rollers in a continuous fashion, and a fourth actuator operable to change a geometry of the third shifter mechanism, wherein the first belt-driven mechanism and the second belt-driven mechanism are shiftable in unison along at least one common axis, and wherein the first belt-driven mechanism and the second belt-driven mechanism are shiftable independently along at least one common axis.

Embodiment 14. The system of embodiment 13, wherein the first belt-driven mechanism and the second belt-driven mechanism are translatable independently along a first axis and in unison along a second axis that is perpendicular to the first axis.

Embodiment 15. The system of embodiment 13 or 14, further comprising at least one detection system coupled to the third shifter mechanism, the at least one detection system operable to detect at least one margin of an object located in the storage space.

Embodiment 16. The system of any of embodiments 13-15, wherein the at least one detection system comprises a structured light scanning system.

Embodiment 17. The system of any of embodiments 13-16, wherein the at least one detection system comprises a contact element that is extendable and retractable.

Embodiment 18. The system of any of embodiments 13-17, wherein the at least one detection system comprises a sensor coupled to the rotational actuator, wherein the sensor detects a level of resistance in response to a rotational force applied by the rotational actuator.

Embodiment 19. The system of any of embodiments 13-18, wherein the first belt, the second belt, and the third belt each comprise textured rubber; bristles; micro-needles; or electro-adhesion pads.

Embodiment 20. The system of any of embodiments 13-19, wherein the third shifter mechanism further comprises an elongated structure having a first end and a second end; a pin coupled to the second end of the elongated structure; a slot that encloses the pin such that the pin is movable within the slot; and a linear actuator coupled to the elongated structure and to the pin, wherein the linear actuator is operable to shift the pin along the slot to thereby change the geometry of the third shifter mechanism.

Embodiment 21. A system for engaging and shifting objects in a storage space, the storage space having a horizontal length and a vertical length, the system comprising a plurality of shifter assemblies positioned in the storage space, wherein each shifter assembly comprises at least a pair of shifter mechanisms that are displaceable along the vertical length, wherein the plurality of shifter assemblies are positioned side-by-side in the storage space along the horizontal length, and wherein the plurality of shifter assemblies are operable in coordination, and in different combinations, to engage and shift objects of different sizes within the storage space.

Embodiment 22. The system of embodiment 21, wherein the plurality of shifter assemblies comprises 2-25 shifter assemblies.

Embodiment 23. The system of embodiment 21 or 22, wherein each shifter mechanism of an associated shifter assembly comprises a belt-driven mechanism that is extendable into the storage space and retractable out of the storage space.

Embodiment 24. The system of any of embodiments 21-23, wherein each shifter assembly is extendable into the storage space and retractable out of the storage space independently.

Embodiment 25. The preceding embodiments 1-24 in any combination.

In some embodiments, this disclosure may include the language, for example, "at least one of [element A] and [element B]." This language may refer to one or more of the elements. For example, "at least one of A and B" may refer to "A," "B," or "A and B." In other words, "at least one of A and B" may refer to "at least one of A and at least one of B," or "at least either of A or B." In some embodiments, this disclosure may include the language, for example, "[element A], [element B], and/or [element C]." This language may refer to either of the elements or any combination thereof. In other words, "A, B, and/or C" may refer to "A," "B," "C," "A and B," "A and C," "B and C," or "A, B, and C." In addition, this disclosure may use the term "and/or" which may refer to any one or combination of the associated elements.

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations and sub-combinations of elements, as well as use of elements not shown, are also possible and contemplated herein.

What is claimed is:

1. A system for engaging and shifting objects of different sizes in a space, the space having a horizontal length and a vertical length, the system comprising:
   a plurality of shifter assemblies positioned in the space, wherein each shifter assembly of the plurality of shifter assemblies comprises at least a pair of shifter mechanisms that are operable in coordination to displace along the vertical length to engage an object,
   wherein the plurality of shifter assemblies are positioned side-by-side in the storage space along the horizontal length, wherein the plurality of shifter assemblies are operable in different combinations based on a size of the object and in coordination along the horizontal length to shift the object within the space, and wherein at least one shifter mechanism of the pair of shifter mechanisms for each of the shifter assemblies of the plurality of shifter assemblies is coupled to a position-changing mechanism that is operable to shift a distal end of the at least one shifter mechanism to a plurality of different positions.

2. The system of claim 1, wherein at least two shifter assembles of the plurality of shifter assemblies operate in coordination to engage and shift the object based on the size of the object exceeding a shifter mechanism of the pair of shifter mechanisms that make up at least one of the at least two shifter assemblies.

3. The system of claim 1, wherein each shifter mechanism of the pair of shifter mechanisms for each shifter assembly of the plurality of shifter assemblies comprises a belt-driven mechanism that is extendable into the space and retractable out of the space.

4. The system of claim 1, wherein each shifter assembly of the plurality of shifter assemblies is extendable into the space and retractable out of the space independently.

5. The system of claim 1, wherein the position-changing mechanism is operable to shift the distal end in at least one of an x-direction, a y-direction, or a z-direction.

6. A method, comprising:
   unloading a first object having a first size out of a space using a first combination of shifter assemblies having a first number of a plurality of shifter assemblies by:
      engaging the first object with the first combination of shifter assemblies, wherein each shifter assembly of the first combination of shifter assemblies comprises at least two belt-driven mechanisms that are operable in coordination to shift along a vertical axis of the space to engage the first object; and
      shifting the first object with the first combination of shifter assemblies, wherein the first combination of shifter assemblies are operable in coordination to shift along a horizontal axis of the space, wherein the first number of the plurality of shifter assemblies is based on the first size; and
   unloading a second object having a second size out of the space using a second combination of shifter assemblies having a second number of the plurality of shifter assemblies by:
      engaging the second object with the second combination of shifter assemblies, wherein each shifter assembly of the second combination of shifter assemblies comprises at least two belt-driven mechanisms that are operable in coordination to shift along the vertical axis of the space to engage the second object; and
      shifting the second object with the second combination of shifter assemblies, wherein the second combination of shifter assemblies are operable in coordination to shift along the horizontal axis of the space, wherein the second number of the plurality of shifter assemblies is based on the second size, and the second number is different than the first number.

7. The method of claim 6, wherein unloading the first object out of the space using the first combination of shifter assemblies further comprises detecting, with a detection system, that at least one margin of the first object is located within a detection distance of the detection system.

8. The method of claim 6, wherein the at least two belt-driven mechanisms for a shifter assembly of the first combination of shifter assembles comprises a belt, a plurality of rollers, and an actuator operable to translate the belt over the plurality of rollers in a continuous fashion.

9. The method of claim 6, wherein the first number of the plurality of shifter assemblies is based on the first size of the first object exceeding a dimension of the at least two belt-driven mechanisms that make up at least one shifter assembly of the plurality of shifter assemblies.

10. The method of claim 6, wherein each belt-driven mechanism of the at least two belt-driven mechanisms for a shifter assembly of the first combination of shifter assembles is extendable into the space and retractable out of the space.

11. The method of claim 6, wherein each shifter assembly of the plurality of shifter assemblies is extendable into the space and retractable out of the space independently.

12. The method of claim 6, wherein each shifter assembly of the first combination of shifter assemblies comprises:
   a first position-changing mechanism that is operable to shift a first belt-driven mechanism of the at least two belt-driven mechanisms in each of an x-direction, a y-direction, and a z-direction, and a second position-changing mechanism that is operable to shift a second belt-driven mechanism of the at least two belt-driven mechanisms in each of the x-direction, the y-direction, and the z-direction.

13. A method, comprising:
   loading an object having a certain size into a space using a combination of shifter assemblies having a certain number of a plurality of shifter assemblies by:
      engaging the object with the combination of shifter assemblies, wherein each shifter assembly of the combination of shifter assemblies comprises at least two belt-driven mechanisms that are operable in coordination to shift along a vertical axis of the space to engage the object; and
      shifting the object with the combination of the shifter assemblies, wherein the combination of shifter assemblies are operable in coordination to shift along a horizontal axis of the space, and the certain number of the plurality of shifter assemblies is based on the certain size.

14. The method of claim 13, wherein the at least two belt-driven mechanisms for a shifter assembly of the combination of shifter assembles comprises a belt, a plurality of rollers, and an actuator operable to translate the belt over the plurality of rollers in a continuous fashion.

15. The method of claim 13, wherein the certain number of the plurality of shifter assemblies is based on the certain size of the object exceeding a dimension of the at least two belt-driven mechanisms that make up at least one of shifter assembly of the plurality of shifter assemblies.

16. A system for engaging and shifting objects of different sizes in a space, the space having a horizontal length and a vertical length, the system comprising:
   a plurality of shifter assemblies positioned in the space, wherein each shifter assembly of the plurality of shifter assemblies comprises at least a pair of shifter mechanisms that are operable in coordination to displace along the vertical length to engage an object,
   wherein the plurality of shifter assemblies are positioned side-by-side in the storage space along the horizontal length,
   wherein the plurality of shifter assemblies are operable in different combinations based on a size of the object and in coordination along the horizontal length to shift the object within the storage space, and wherein a distal end of at least one shifter mechanism of the pair of shifter mechanisms for each of the shifter assemblies of the plurality of shifter assembles is pivotally coupled to a belt-driven mechanism through a rotational actuator, the rotational actuator operable to pivot the belt-driven mechanism to a plurality of different positions.

17. The system of claim 16, further comprising a detection system coupled to at least the belt-driven mechanism, wherein the detection system is operable to detect at least one margin of an object located within a detection distance of the detection system.

18. The system of claim 17, wherein the detection system comprises at least one of a structured light scanning system, a contact element that is extendable and retractable, at least one optical sensor coupled to a processor, or a sensor that detects a level of resistance in response to a rotational force applied by the rotational actuator.

19. A system for engaging and shifting objects of different sizes in a space, the space having a horizontal length and a vertical length, the system comprising:

a plurality of shifter assemblies positioned in the space, wherein each shifter assembly of the plurality of shifter assemblies comprises at least a pair of shifter mechanisms that are operable in coordination to displace along the vertical length to engage an object, wherein the plurality of shifter assemblies are positioned side-by-side in the storage space along the horizontal length, wherein the plurality of shifter assemblies are operable in different combinations based on a size of the object and in coordination along the horizontal length to shift the object within the storage space, and wherein each shifter assembly of the plurality of shifter assemblies comprises:

a first position-changing mechanism that is operable to shift a first shifter mechanism of the pair of shifter mechanisms in each of an x-direction, a y-direction, and a z-direction, and a second position-changing mechanism that is operable to shift a second shifter mechanism of the pair of shifter mechanisms in each of the x-direction, the y-direction, and the z-direction.

20. The system of claim 19, wherein at least two shifter assembles of the plurality of shifter assemblies operate in coordination to engage and shift the object based on the size of the object exceeding a shifter mechanism of the pair of shifter mechanisms that make up at least one of the at least two shifter assemblies.

* * * * *

UNITED STATES PATENT AND TRADEMARK OFFICE
CERTIFICATE OF CORRECTION

| | |
|---|---|
| PATENT NO. | : 12,065,315 B2 |
| APPLICATION NO. | : 18/138448 |
| DATED | : August 20, 2024 |
| INVENTOR(S) | : Julio Gil, Julian Leland Bell and Youngjun Choi |

It is certified that error appears in the above-identified patent and that said Letters Patent is hereby corrected as shown below:

In the Claims

- In Claim 2, Column 21, Line 12, "assembles" should read -- assemblies --.
- In Claim 8, Column 22, Line 3, "assembles" should read -- assemblies --.
- In Claim 10, Column 22, Line 13, "assembles" should read -- assemblies --.
- In Claim 14, Column 22, Line 47, "assembles" should read -- assemblies --.
- In Claim 16, Column 23, Line 7, "assembles" should read -- assemblies --.
- In Claim 20, Column 24, Line 22, "assembles" should read -- assemblies --.

Signed and Sealed this
Twelfth Day of November, 2024

Katherine Kelly Vidal
*Director of the United States Patent and Trademark Office*